(12) United States Patent
Yin

(10) Patent No.: US 11,089,116 B2
(45) Date of Patent: *Aug. 10, 2021

(54) OPERATION TRIGGERING METHOD AND APPARATUS FOR MACHINE-TO-MACHINE COMMUNICATIONS

(71) Applicant: Huawei Technologies Co., Ltd., Shenzhen (CN)

(72) Inventor: Jiaxin Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,833

(22) Filed: May 18, 2020

(65) Prior Publication Data
US 2020/0280611 A1 Sep. 3, 2020

Related U.S. Application Data

(63) Continuation of application No. 15/910,592, filed on Mar. 2, 2018, now Pat. No. 10,681,153, which is a
(Continued)

(51) Int. Cl.
*G06F 15/16* (2006.01)
*H04L 29/08* (2006.01)
(Continued)

(52) U.S. Cl.
CPC .............. *H04L 67/16* (2013.01); *H04L 67/10* (2013.01); *H04W 4/18* (2013.01); *H04W 4/70* (2018.02); *H04W 88/18* (2013.01)

(58) Field of Classification Search
CPC .......... H04L 67/16; H04L 67/10; H04W 4/70; H04W 4/18; H04W 88/18
See application file for complete search history.

(56) References Cited

U.S. PATENT DOCUMENTS

2013/0219064 A1    8/2013  Zhang et al.
2013/0336222 A1* 12/2013  Lu .................. H04W 72/00
                                                    370/328
(Continued)

FOREIGN PATENT DOCUMENTS

CN    101730123 A    6/2010
CN    201590145 U    9/2010
(Continued)

OTHER PUBLICATIONS

Elmangoush, A., et al., "Design of RESTful APIs for M2M Services," 2012 International Conference on Intelligence in Next Generation Networks, Oct. 8-11, 2012, pp. 50-56.
(Continued)

*Primary Examiner* — Cheikh T Ndiaye
(74) *Attorney, Agent, or Firm* — Slater Matsil, LLP

(57) ABSTRACT

Embodiments provide an operation triggering method and apparatus for machine-to-machine communications. The method is implemented in a service capability middleware, and includes retrieving a change result of the content of the subject resource stored in the service capability middleware; retrieving a representation of the operation resource associated with the subject resource, where the representation of the operation resource includes a condition for sending an operation request to an object resource and a uniform resource identifier of the object resource; constructing the operation request for the object resource when it is determined that the change result meets the condition for sending the operation request to the object resource in the representation of the operation resource; and sending the operation request to the object resource.

12 Claims, 13 Drawing Sheets

Related U.S. Application Data continuation of application No. 14/825,972, filed on Aug. 13, 2015, now Pat. No. 9,936,029, which is a continuation of application No. PCT/CN2013/071704, filed on Feb. 20, 2013.

(51) Int. Cl.
*H04W 4/18* (2009.01)
*H04W 4/70* (2018.01)
*H04W 88/18* (2009.01)

(56) References Cited

U.S. PATENT DOCUMENTS

| | | | | |
|---|---|---|---|---|
| 2014/0126581 | A1* | 5/2014 | Wang | H04L 41/0806 370/431 |
| 2014/0215043 | A1* | 7/2014 | Ryu | G06F 16/955 709/223 |
| 2014/0244568 | A1 | 8/2014 | Goel et al. | |
| 2015/0055640 | A1* | 2/2015 | Wang | H04W 60/00 370/338 |
| 2015/0244776 | A1* | 8/2015 | Pareglio | H04L 67/10 709/204 |
| 2015/0373127 | A1* | 12/2015 | Ly | H04L 67/16 709/217 |

FOREIGN PATENT DOCUMENTS

| | | | |
|---|---|---|---|
| CN | 102136933 | A | 7/2011 |
| CN | 102185802 | A | 9/2011 |
| CN | 102740452 | A | 10/2012 |
| EP | 2523528 | A1 | 11/2012 |
| JP | 2005130423 | A | 5/2005 |
| WO | 2011001370 | A1 | 1/2011 |
| WO | 2012109531 | A2 | 8/2012 |

OTHER PUBLICATIONS

ETSI Technical Specification, "Machine-to-Machine Communications (M2M); Functional Architecture," ETSI TS 102 690 V1.1.1, Oct. 2011, 280 pages.

ETSI Technical Specification, "Machine-to-Machine Communications (M2M); Functional Architecture," ETSI TS 102 690 V2.0.12, Dec. 2012, 301 pages.

ETSI Technical Specification, "Machine-to-Machine Communications (M2M); MLA, DLA and MLD Interfaces," ETSI TS 102 921 V1.1.1, Feb. 2012, 538 pages.

Iwasaki, Y., "RESTful and Secure Collaboration Framework for Heterogeneous Smart Spaces," Multimedia, Dispersed, Collaboration and Mobile (DICOMO2008) Symposium Proceedings, Information Processing Society of Japan Symposium Series [CD-ROM], The Information Processing Society of Japan, Jul. 9, 2008, vol. 2008, No. 1, pp. 185-194.

Ozawa, M. et al. "A Design of a Context-Aware Service Coordination Framework Based on REST Archtecture Style," Mar. 20-23, 2007, pp. 1-8.

* cited by examiner

OPERATION TRIGGERING METHOD AND APPARATUS FOR MACHINE-TO-MACHINE COMMUNICATIONS

CROSS-REFERENCE TO RELATED APPLICATIONS

This application is a continuation of U.S. patent application Ser. No. 15/910,592, filed on Mar. 2, 2018, which is a continuation of U.S. patent application Ser. No. 14/825,972, filed on Aug. 13, 2015, now U.S. Pat. No. 9,936,029. The U.S. patent application Ser. No. 14/825,972 is a continuation of International Application No. PCT/CN2013/071704, filed on Feb. 20, 2013. All of the aforementioned patent applications are hereby incorporated by reference in their entireties.

TECHNICAL FIELD

The present invention relates to the computer field, and in particular, to an operation triggering method and apparatus for machine-to-machine communications.

BACKGROUND

Machine-to-machine communications (M2M for short hereinafter) is a networked application and service centering on intelligent machine-to-machine interaction. By embedding a wireless or wired communications module and application processing logic in a machine, the M2M implements data communication without manual intervention. In this manner, information requirements of users in aspects of monitoring, commanding and scheduling, data collection and measurement, and the like are met. In a conventional typical M2M application network architecture, various M2M terminals (such as a sensor and a microcontroller) access an M2M service platform directly or remotely by using an M2M gateway, while various M2M applications (such as electricity meter reading and intelligent traffic) retrieve, with a service capability provided by the M2M service platform, data collected by the M2M terminals, or perform remote control and management on the M2M terminals.

The European Telecommunications Standards Institute (ETSI) M2M uses a RESTful architecture. REST, an acronym for Representational State Transfer, means "representational state transfer". If an architecture is based on REST, the architecture is referred to as a RESTful architecture. Its characteristic is that everything is made up of resources, where a resource is a text segment existing in a network or is in multiple other media forms. Each resource has a unique uniform resource identifier (URI). An application program or service capability middleware may access the resource using the URI. Each resource is accessed in fixed manners, including manners such as create, update, delete, and retrieve. In addition, in the RESTful architecture, a client and a server are both stateless.

In an M2M system, the following scenario exists extensively. When a status of a device changes, another device or multiple devices may perform a single operation or a series of operations according to whether the change meets a condition. The action of foregoing operation triggering is implemented by an application program installed on a specific device (such as a device that directly performs the operations). However, in some restricted environments, the device needs to go to sleep periodically, and the application program is interrupted as the device goes to sleep. Consequently, operations between resources cannot be triggered. In some scenarios in which the device needs to be offline and used outdoors, a service of the application program is interrupted as the device is offline. Therefore, in the M2M system, operation triggering using the application program suffers from a disadvantage of poor stability.

SUMMARY

Embodiments of the present invention provide an operation triggering method and apparatus for machine-to-machine communications to improve stability of operation triggering in an M2M system.

A first aspect of embodiments of the present invention provides an operation triggering method for machine-to-machine communications. Service capability middleware stores a representation of a subject resource, where the representation of the subject resource includes content of the subject resource and information about an operation resource associated with the subject resource. The method includes, when the content of the subject resource is changed, retrieving, by the service capability middleware, a change result of the content of the subject resource stored in the service capability middleware. The method also includes retrieving, by the service capability middleware according to the information about the operation resource associated with the subject resource, a representation of the operation resource associated with the subject resource. The representation of the operation resource includes a condition for sending an operation request to an object resource and a uniform resource identifier of the object resource. The method also includes constructing the operation request for the object resource when the service capability middleware determines that the change result meets the condition for sending the operation request to the object resource in the representation of the operation resource. The method also includes sending, by the service capability middleware, the operation request to the object resource according to the uniform resource identifier of the object resource.

With reference to the first aspect of embodiments of the present invention, in a first possible implementation manner, the information about the operation resource associated with the subject resource is the representation of the operation resource associated with the subject resource, and the retrieving, by the service capability middleware according to the information about the operation resource associated with the subject resource, a representation of the operation resource associated with the subject resource, includes retrieving, by the service capability middleware according to the representation, included in the representation of the subject resource, of the operation resource associated with the subject resource, the representation of the operation resource associated with the subject resource. In an embodiment, the information about the operation resource associated with the subject resource is a uniform resource identifier of the operation resource associated with the subject resource, and the retrieving, by the service capability middleware according to the information about the operation resource associated with the subject resource, a representation of the operation resource associated with the subject resource, includes: retrieving, by the service capability middleware according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs, and the retrieving, by the service capability middleware according to the information about the operation resource associated with the subject resource, a representation of the operation resource associated with the subject resource, includes: retrieving, by the service capability middleware according to the uniform resource identifier, included in the representation of the subject resource, of the operation resource set to which the operation resource belongs, the representation of the operation resource associated with the subject resource, where the representation of the operation resource associated with the subject resource is a representation of an operation resource included in the operation resource set.

With reference to the first aspect of embodiments of the present invention or the first possible implementation manner, in a second possible implementation manner, before the retrieving, by the service capability middleware, a change result of the content of the subject resource stored in the service capability middleware, the method further includes: receiving, by the service capability middleware, a subject resource update request, where the subject resource update request includes a representation of a new subject resource and a uniform resource identifier of the subject resource to be updated, where the representation of the new subject resource includes information about an operation resource associated with the new subject resource, and updating, by the service capability middleware, the stored representation of the subject resource to the representation of the new subject resource according to the uniform resource identifier of the subject resource to be updated. In an embodiment, before the retrieving, by the service capability middleware, a change result of the content of the subject resource stored in the service capability middleware, the method further includes: receiving, by the service capability middleware, an operation resource create request, where the operation resource create request includes the representation of the operation resource associated with the subject resource and the uniform resource identifier of the operation resource set to which the operation resource associated with the subject resource belongs, and adding, by the service capability middleware, the representation of the operation resource to the operation resource set according to the uniform resource identifier of the operation resource set to which the operation resource belongs.

With reference to the first aspect or the first or second possible implementation manner, in a third possible implementation manner, the representation of the operation resource further includes a type of the operation request and an input parameter of the operation request, where the type of the operation request is create or update. When the input parameter is a uniform resource identifier of a parameter resource, the constructing the operation request for the object resource includes: retrieving, by the service capability middleware, a representation of a new object resource from the parameter resource that is pointed to by the uniform resource identifier of the parameter resource, and constructing the operation request that includes the uniform resource identifier of the object resource and the representation of the new object resource and that is for the object resource in the representation of the operation resource. In an embodiment, when the input parameter is a representation of a new object resource, the constructing the operation request for the object resource includes: constructing, by the service capability middleware, the operation request that includes the uniform resource identifier of the object resource and the representation of the new object resource and that is for the object resource in the representation of the operation resource.

With reference to the first aspect or any one of the first to the third possible implementation manners, in a fourth possible implementation manner, before the retrieving, by the service capability middleware, a change result of the content of the subject resource stored in the service capability middleware, the method further includes: receiving, by the service capability middleware, an operation resource update request, where the operation resource update request includes a representation of a new operation resource, where the representation of the new operation resource includes a representation of a dependency resource or a uniform resource identifier of a dependency resource, and updating, by the service capability middleware, the stored representation of the operation resource to the representation of the new operation resource. In an embodiment, before the retrieving, by the service capability middleware, a change result of the content of the subject resource stored in the service capability middleware, the method further includes: receiving, by the service capability middleware, a dependency resource create request, where the dependency resource create request includes a representation of a dependency resource and a uniform resource identifier of a dependency resource set to which the dependency resource belongs, saving, by the service capability middleware, the representation of the dependency resource to the dependency resource set according to the uniform resource identifier of the dependency resource set to which the dependency resource belongs, and adding the uniform resource identifier of the dependency resource set to the representation of the operation resource.

With reference to the fourth possible implementation manner, in a fifth possible implementation manner, before the constructing, by the service capability middleware, the operation request for the object resource, the method includes: retrieving, by the service capability middleware according to the representation of the operation resource, the representation of the dependency resource associated with the operation resource; retrieving, by the service capability middleware, a representation of a condition resource that is pointed to by a uniform resource identifier in the representation of the dependency resource; and determining, by the service capability middleware according to the representation of the condition resource, that a condition in the representation of the dependency resource is met.

With reference to the fifth possible implementation manner, in a sixth possible implementation manner, types of the dependency resource are classified into a sufficient condition type and a necessary condition type, and a dependency resource quantity is at least one. Before the constructing, by the service capability middleware, the operation request for the object resource in the representation of the operation resource, the method further includes: determining that a condition specified by at least one dependency resource of the sufficient condition type is met, or determining that conditions specified by all dependency resources of the necessary condition type are met.

With reference to the fifth possible implementation manner, in a seventh possible implementation manner, the retrieving, by the service capability middleware according to the representation of the operation resource, the representation of the dependency resource associated with the operation resource, includes: retrieving, by the service capability middleware according to the representation of the dependency resource included in the representation of the operation resource, the representation of the dependency resource associated with the operation resource. In an embodiment, the retrieving, by the service capability middleware according to the representation of the operation resource, the representation of the dependency resource associated with the operation resource, includes: retrieving, by the service capability middleware according to the uniform resource identifier of the dependency resource included in the representation of the operation resource, the representation of the dependency resource associated with the operation resource. In an embodiment, the retrieving, by the service capability middleware according to the representation of the operation resource, the representation of the dependency resource associated with the operation resource, includes: retrieving, by the service capability middleware according to the uniform resource identifier, included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

With reference to the first aspect or any one of the foregoing possible implementation manners, in an eighth possible implementation manner, it is determined that at least two operation resources are associated with the subject resource, where representations of the operation resources further include priorities. The constructing, by the service capability middleware, the operation request for the object resource in the representation of the operation resource, includes: constructing, by the service capability middleware, an operation request for an object resource in the representation of each operation resource in sequence according to the priorities in the representations of the operation resources.

With reference to the first aspect or any one of the foregoing possible implementation manners, in a ninth possible implementation manner, the representation of the operation resource further includes an operation execution result, and the method further includes: receiving, by the service capability middleware, an operation response returned by a device that the object resource is located, and saving the operation response into the operation execution result in the representation of the operation resource. In an embodiment, the representation of the operation resource further includes an address reflecting an operation execution result and the operation execution result, and the method further includes: receiving, by the service capability middleware, an operation response returned by a device that the object resource is located, retrieving, according to the address reflecting the operation execution result, an operation result corresponding to the operation request, and saving the operation result corresponding to the operation request into the operation execution result.

A second aspect of embodiments of the present invention provides an operation triggering apparatus for machine-to-machine communications, including a retrieving module, a constructing module, and a sending module. The retrieving module is configured to retrieve a change result of content of a subject resource stored in a service capability middleware when the content of the subject resource is changed. The retrieving module is also configured to retrieve, according to information about an operation resource associated with the subject resource, a representation of the operation resource associated with the subject resource. The representation of the operation resource includes a condition for sending an operation request to an object resource and a uniform resource identifier of the object resource. The service capability middleware stores a representation of the subject resource, where the representation of the subject resource includes the content of the subject resource and the information about the operation resource associated with the subject resource. The retrieving module is further configured to send the change result and the representation of the operation resource to the constructing module. The constructing module is configured to receive the change result and the representation of the operation resource associated with the subject resource, and when it is determined that the change result meets the condition for sending the operation request to the object resource in the representation of the operation resource, construct the operation request for the object resource, and send the operation request to the sending module. The sending module is configured to receive the operation request, and send the operation request to the object resource according to the uniform resource identifier of the object resource.

With reference to the second aspect of embodiments of the present invention, in a first possible implementation manner, the information about the operation resource associated with the subject resource is the representation of the operation resource associated with the subject resource, and the retrieving module retrieving, according to information about an operation resource associated with the subject resource, a representation of the operation resource associated with the subject resource, comprises the retrieving module retrieving, according to the representation, included in the representation of the subject resource, of the operation resource associated with the subject resource, the representation of the operation resource associated with the subject resource. In an embodiment, the information about the operation resource associated with the subject resource is a uniform resource identifier of the operation resource associated with the subject resource, and the retrieving module retrieving, according to information about an operation resource associated with the subject resource, a representation of the operation resource associated with the subject resource, comprises: the retrieving module retrieving, according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs, and the retrieving module retrieving, according to information about an operation resource associated with the subject resource, a representation of the operation resource associated with the subject resource, comprises: the retrieving module retrieving, according to the uniform resource identifier, included in the representation of the subject resource, of the operation resource set to which the operation resource belongs, the representation of the operation resource associated with the subject resource, where the representation of the operation resource associated with the subject resource is a representation of an operation resource included in the operation resource set.

With reference to the second aspect of embodiments of the present invention or the first possible implementation manner, in a second possible implementation manner, the apparatus further includes a receiving module. The receiving module is configured to receive a subject resource update request before the retrieving module retrieves the change result of the content of the subject resource stored in the apparatus. The subject resource update request includes a representation of a new subject resource and a uniform resource identifier of the subject resource to be updated. The representation of the new subject resource includes information about an operation resource associated with the new subject resource. The receiving module updates the stored representation of the subject resource to the representation of the new subject resource according to the uniform resource identifier of the subject resource to be updated. In an embodiment, the receiving module is configured to receive an operation resource create request before the retrieving module retrieves the change result of the content of the subject resource stored in the apparatus. The operation resource create request includes the representation of the operation resource associated with the subject resource and the uniform resource identifier of the operation resource set to which the operation resource belongs. The receiving module adds the representation of the operation resource to the operation resource set according to the uniform resource identifier of the operation resource set to which the operation resource belongs.

With reference to the second aspect or the first or second possible implementation manner, in a third possible implementation manner, the representation of the operation resource further includes a type of the operation request and an input parameter of the operation request, where the type of the operation request is create or update. When the input parameter is a uniform resource identifier of a parameter resource, the constructing module constructs the operation request for the object resource comprises the construction module: retrieving a representation of a new object resource from the parameter resource that is pointed to by the uniform resource identifier of the parameter resource, and constructing the operation request that includes the uniform resource identifier of the object resource and the representation of the new object resource and that is for the object resource in the representation of the operation resource. In an embodiment, when the input parameter is a representation of a new object resource, the constructing module constructs the operation request for the object resource comprises the constructing module: constructing the operation request that includes the uniform resource identifier of the object resource and the representation of the new object resource and that is for the object resource in the representation of the operation resource.

With reference to the second aspect or any one of the first to the third possible implementation manners, in a fourth possible implementation manner, the receiving module is further configured to receive an operation resource update request before the retrieving module retrieves the change result of the content of the subject resource stored in the service capability middleware. The operation resource update request includes a representation of a new operation resource, where the representation of the new operation resource includes a representation of a dependency resource or a uniform resource identifier of a dependency resource. The receiving module is also configured to update the stored representation of the operation resource to the representation of the new operation resource. In an embodiment, the receiving module is further configured to receive a dependency resource create request before the retrieving module retrieves the change result of the content of the subject resource stored in the service capability middleware. The dependency resource create request includes a representation of a dependency resource and a uniform resource identifier of a dependency resource set to which the dependency resource belongs. The receiving module is also configured to save the representation of the dependency resource to the dependency resource set according to the uniform resource identifier of the dependency resource set to which the dependency resource belongs, and add the uniform resource identifier of the dependency resource set to the representation of the operation resource.

With reference to the fourth possible implementation manner, in a fifth possible implementation manner, the apparatus may further include a determining module. The retrieving module is further configured to retrieve, according to the representation of the operation resource, the representation of the dependency resource associated with the operation resource, retrieve a representation of a condition resource that is pointed to by a uniform resource identifier in the representation of the dependency resource, and send the representation of the condition resource and a condition in the representation of the dependency resource to the determining module. The determining module is configured to receive the representation of the condition resource, and determine, according to the representation of the condition resource, that the condition in the representation of the dependency resource is met.

With reference to the fifth possible implementation manner, in a sixth possible implementation manner, types of the dependency resource are classified into a sufficient condition type and a necessary condition type, and a dependency resource quantity is at least one. Before the constructing module constructs the operation request for the object resource in the representation of the operation resource, the determining module is further configured to determine that a condition specified by at least one dependency resource of the sufficient condition type is met. In an embodiment, before the constructing module constructs the operation request for the object resource in the representation of the operation resource, the determining module is further configured to determine that conditions specified by all dependency resources of the necessary condition type are met, and the service capability middleware constructs the operation request for the object resource in the representation of the operation resource.

With reference to the fifth possible implementation manner, in a seventh possible implementation manner, the retrieving module further retrieving, according to the representation of the operation resource, the representation of the dependency resource associated with the operation resource, comprises the retrieving module: retrieving, according to the representation of the dependency resource included in the representation of the operation resource, the representation of the dependency resource associated with the operation resource. In an embodiment, the retrieving module further retrieving, according to the representation of the operation resource, the representation of the dependency resource associated with the operation resource, comprises the retrieving module: retrieving, according to the uniform resource identifier of the dependency resource included in the representation of the operation resource, the representation of the dependency resource associated with the operation resource. In an embodiment, the retrieving module further retrieving, according to the representation of the operation resource, the representation of the dependency resource associated with the operation resource, comprises the retrieving module: retrieving, according to the uniform resource identifier included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

With reference to the second aspect or any one of the foregoing possible implementation manners, in an eighth possible implementation manner, it is determined that at least two operation resources are associated with the subject resource. That is, in the operation triggering apparatus for machine-to-machine communications, at least two operation resources are associated with the subject resource. Representations of the operation resources further include priorities. The constructing module constructing the operation request for the object resource in the representation of the operation resource comprises the constructing module: constructing an operation request for an object resource in the representation of each operation resource in sequence according to the priorities in the representations of the operation resources.

With reference to the second aspect or any one of the foregoing possible implementation manners, in a ninth possible implementation manner, the representation of the operation resource further includes an operation execution result. The receiving module is further configured to receive an operation response returned by the device in which the object resource is located, and save the operation response into the operation execution result in the representation of the operation resource. In an embodiment, the representation of the operation resource further includes an address reflecting an operation execution result and the operation execution result, and the receiving module is further configured to receive an operation response returned by the device in which the object resource is located, and the retrieving module is further configured to retrieve, according to the address reflecting the operation execution result, an operation result corresponding to the operation request, and save the operation result corresponding to the operation request into the operation execution result.

A third aspect of embodiments of the present invention provides another operation triggering apparatus for machine-to-machine communications. The apparatus includes a network interface, a processor, and a memory. The network interface is configured to perform communication with an external device. The memory is configured to store an application program. The processor is configured to invoke the application program stored in the memory. The program includes instructions for, when content of a subject resource is changed, retrieving a change result of the content of the subject resource stored in the service capability middleware, and retrieving, according to information about an operation resource associated with the subject resource, a representation of the operation resource associated with the subject resource, where the representation of the operation resource includes a condition for sending an operation request to an object resource and a uniform resource identifier of the object resource. The program further includes instructions for, when it is determined that the change result meets the condition for sending the operation request to the object resource in the representation of the operation resource, constructing the operation request for the object resource, where the service capability middleware stores a representation of the subject resource, and the representation of the subject resource includes the content of the subject resource and the information about the operation resource associated with the subject resource. The network interface is further configured to send the operation request to the object resource according to the uniform resource identifier of the object resource.

With reference to the third aspect of embodiments of the present invention, in a first possible implementation manner, the information about the operation resource associated with the subject resource is the representation of the operation resource associated with the subject resource. In an embodiment, the processor retrieving, according to the representation of the subject resource, a representation of the operation resource associated with the subject resource, comprises the processor being configured to: retrieve, according to the representation of the operation resource included in the representation of the subject resource, the representation of the operation resource associated with the subject resource. In an embodiment, the information about the operation resource associated with the subject resource is a uniform resource identifier of the operation resource associated with the subject resource, and the processor being configured to retrieve, according to the representation of the subject resource, a representation of the operation resource associated with the subject resource, comprises the processor being configured to: retrieve, according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs, and the processor being configured to retrieve, according to the representation of the subject resource, a representation of the operation resource associated with the subject resource, comprises the processor being configured to: retrieve, according to the uniform resource identifier, included in the representation of the subject resource, of the operation resource set to which the operation resource belongs, the representation of the operation resource associated with the subject resource, where the representation of the operation resource associated with the subject resource is a representation of an operation resource included in the operation resource set.

With reference to the third aspect of embodiments of the present invention or the first possible implementation manner, in a second possible implementation manner, the network interface is further configured to receive a subject resource update request. The subject resource update request includes a representation of a new subject resource and a uniform resource identifier of the subject resource to be updated. The representation of the new subject resource includes information about an operation resource associated with the new subject resource. The processor is configured to invokes the application program stored in the memory to update the stored representation of the subject resource to the representation of the new subject resource according to the uniform resource identifier of the subject resource to be updated. In an embodiment, the network interface is further configured to receive an operation resource create request, where the operation resource create request includes the representation of the operation resource associated with the subject resource and the uniform resource identifier of the operation resource set to which the operation resource associated with the subject resource belongs, and the processor invokes the application program stored in the memory to add the representation of the operation resource to the operation resource set according to the uniform resource identifier of the operation resource set to which the operation resource belongs.

With reference to the third aspect or the first or second possible implementation manner, in a third possible implementation manner, the representation of the operation resource further includes a type of the operation request and an input parameter of the operation request, where the type of the operation request is create or update. When the input parameter is a uniform resource identifier of a parameter resource, the processor retrieves a representation of a new object resource from the parameter resource that is pointed to by the uniform resource identifier of the parameter resource, and constructs the operation request that includes the uniform resource identifier of the object resource and the representation of the new object resource and that is for the object resource in the representation of the operation resource. In an embodiment, when the input parameter is a representation of a new object resource, the processor constructs the operation request that includes the uniform resource identifier of the object resource and the representation of the new object resource and that is for the object resource in the representation of the operation resource.

With reference to the third aspect or any one of the first to the third possible implementation manners, in a fourth possible implementation manner, the network interface is further configured to receive an operation resource update request. The operation resource update request includes a representation of a new operation resource. The representation of the new operation resource includes a representation of a dependency resource or a uniform resource identifier of a dependency resource. The processor invokes the application program stored in the memory to update the stored representation of the operation resource to the representation of the new operation resource. In an embodiment, the network interface is further configured to receive a dependency resource create request. The dependency resource create request includes a representation of a dependency resource and a uniform resource identifier of a dependency resource set to which the dependency resource belongs. The processor invokes the application program stored in the memory to save the representation of the dependency resource to the dependency resource set according to the uniform resource identifier of the dependency resource set to which the dependency resource belongs, and add the uniform resource identifier of the dependency resource set to the representation of the operation resource.

With reference to the fourth possible implementation manner, in a fifth possible implementation manner, the processor further retrieves, according to the representation of the operation resource, the representation of the dependency resource associated with the operation resource, retrieves a representation of a condition resource that is pointed to by a uniform resource identifier in the representation of the dependency resource, and determines, according to the representation of the condition resource, that a condition in the representation of the dependency resource is met.

With reference to the fifth possible implementation manner, in a sixth possible implementation manner, types of the dependency resource are classified into a sufficient condition type and a necessary condition type, and a dependency resource quantity is at least one. Before constructing the operation request for the object resource in the representation of the operation resource, the processor further determines that a condition specified by at least one dependency resource of the sufficient condition type is met, or determines that conditions specified by all dependency resources of the necessary condition type are met.

With reference to the fifth possible implementation manner, in a seventh possible implementation manner, the processor retrieves, according to the representation of the dependency resource included in the representation of the operation resource, the representation of the dependency resource associated with the operation resource. In an embodiment, the processor retrieves, according to the uniform resource identifier of the dependency resource included in the representation of the operation resource, the representation of the dependency resource associated with the operation resource; or retrieves, according to the uniform resource identifier, included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

With reference to the third aspect or any one of the foregoing possible implementation manners, in an eighth possible implementation manner, at least two operation resources are associated with the subject resource, representations of the operation resources further include priorities, and the processor constructs an operation request for an object resource in the representation of each operation resource in sequence according to the priorities in the representations of the operation resources.

With reference to the third aspect or any one of the foregoing possible implementation manners, in a ninth possible implementation manner, the representation of the operation resource further includes an operation execution result. The network interface is further configured to receive an operation response returned by the device in which the object resource is located. The processor saves the operation response into the operation execution result in the representation of the operation resource. In an embodiment, the representation of the operation resource further includes an address reflecting an operation execution result and the operation execution result. The network interface is further configured to receive an operation response returned by the device that the object resource is located. The processor retrieves, according to the address reflecting the operation execution result, an operation result corresponding to the operation request, and saves the operation result corresponding to the operation request into the operation execution result.

The service capability middleware in the foregoing embodiments of the present invention may be middleware on an M2M platform or a gateway. Both the M2M platform and the gateway are nodes having capabilities in a network. Therefore a problem of capability restriction does not exist, which is advantageous for handling situations in which services cannot be performed in restricted environments. In addition, in the foregoing embodiments of the present invention, the representation of the operation resource associated with the subject resource can be retrieved according to the representation of the subject resource. As such, operation triggering relationships between resources may be distributed on each node (the M2M platform or the gateway), thereby avoiding complexity of a single application program. The technical solutions provided by the foregoing embodiments of the present invention can enhance capabilities of the middleware on the M2M platform and the gateway, so that it is possible to deploy richer applications.

Introduction of the operation resource makes operation triggering more applicable to a RESTful architecture.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
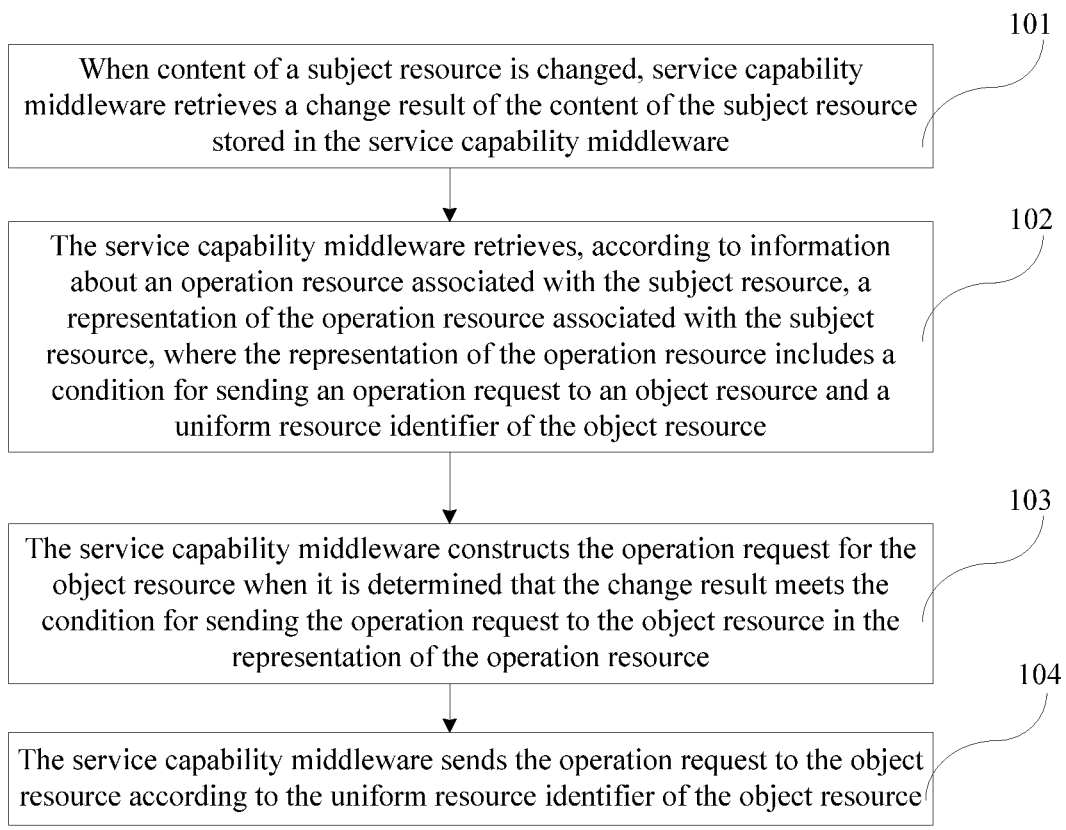
FIG. 1 is a schematic flowchart of an operation triggering method for M2M according to an embodiment of the present invention.

In view of disadvantages of a high maintenance cost and poor stability of the operation triggering method for M2M in a current system, an embodiment of the present invention provides a technical solution, where service capability middleware stores a representation of a subject resource. The representation of the subject resource includes content of the subject resource and information about an operation resource associated with the subject resource. As shown in FIG. 1, an operation triggering method for M2M according to the embodiment of the present invention includes the following steps.

Step 101: When the content of the subject resource is changed, the service capability middleware retrieves a change result of the content of the subject resource stored in the service capability middleware.

Step 102: The service capability middleware retrieves, according to the information about the operation resource associated with the subject resource, a representation of the operation resource associated with the subject resource. The representation of the operation resource includes a condition for sending an operation request to an object resource and a uniform resource identifier of the object resource.

Step 103: The service capability middleware constructs the operation request for the object resource when determining that the change result meets the condition for sending the operation request to the object resource in the representation of the operation resource.

Step 104: The service capability middleware sends the operation request to the object resource according to the uniform resource identifier of the object resource.

In the technical solution provided by the foregoing embodiment of the present invention, when the content of the subject resource is changed, the service capability middleware storing the change result of the content of the subject resource retrieves, according to the information about the operation resource associated with the subject resource, the representation of the operation resource associated with the subject resource, constructs the operation request for the object resource in the representation of the operation resource, and sends the operation request to the object resource in the representation of the operation resource.

The service capability middleware in the foregoing embodiment of the present invention may be middleware on an M2M platform or gateway. Both the M2M platform and the gateway are nodes having capabilities in a network. Therefore a problem of capability restriction does not exist, which is advantageous for handling situations in which services cannot be performed in restricted environments. In addition, in the foregoing embodiment of the present invention, the representation of the operation resource associated with the subject resource can be retrieved according to the information about the operation resource associated with the subject resource. That is, an association is established between the subject resource and the operation resource, so that operation triggering relationships between resources may be distributed on each node (the M2M platform or the gateway), for example, on each node storing a subject resource, thereby avoiding complexity of a single application program. For example, an operation of turning off an air conditioner may be used as an operation resource, while detecting whether a master is at home and detecting an indoor temperature may separately exist as a subject resource. According to the embodiment of the present invention, the operation resource of turning off the air conditioner may be saved to service capability middleware on a gateway to which the air conditioner belongs, while the two subject resources of detecting whether the host is at home and detecting the indoor temperature are separately saved to service capability middleware on different gateways. By establishing an association between the subject resources and the operation resource distributed on different platforms, an operation triggering function may also be implemented. The technical solution provided by the embodiment of the present invention can enhance capabilities of the middleware on the M2M platform and the gateway, so that it is possible to deploy richer applications. Introduction of the operation resource makes operation triggering more applicable to a RESTful architecture.

In the foregoing embodiment of the present invention, the information about the operation resource associated with the subject resource is the representation of the operation resource associated with the subject resource. The service capability middleware retrieving, according to the information about the operation resource associated with the subject resource, a representation of the operation resource associated with the subject resource in step 102, may include: retrieving, by the service capability middleware according to the representation, included in the representation of the subject resource, of the operation resource associated with the subject resource, the representation of the operation resource associated with the subject resource. In an embodiment, the information about the operation resource associated with the subject resource is a uniform resource identifier of the operation resource associated with the subject resource, and the service capability middleware retrieving, according to the information about the operation resource associated with the subject resource, a representation of the operation resource associated with the subject resource, includes: retrieving, by the service capability middleware according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs, and the service capability middleware retrieving, according to the information about the operation resource associated with the subject resource, a representation of the operation resource associated with the subject resource, includes: retrieving, by the service capability middleware according to the uniform resource identifier, included in the representation of the subject resource, of the operation resource set to which the operation resource belongs, the representation of the operation resource associated with the subject resource, where the representation of the operation resource associated with the subject resource is a representation of an operation resource included in the operation resource set.

That is, the association between the subject resource and the operation resource may be established in three manners: the representation of the subject resource includes the representation of the operation resource, the representation of the subject resource includes the uniform resource identifier of the operation resource, or the representation of the subject resource includes the uniform resource identifier of the operation resource set to which the operation resource belongs.

In the foregoing embodiment of the present invention, before the service capability middleware retrieves the change result of the content of the subject resource stored in the service capability middleware in step 101, the method further includes: receiving, by the service capability middleware, a subject resource update request, where the subject resource update request includes a representation of a new subject resource and a uniform resource identifier of the subject resource to be updated. The representation of the new subject resource includes information about an operation resource associated with the new subject resource. The method further includes: updating, by the service capability middleware, the stored representation of the subject resource to the representation of the new subject resource according to the uniform resource identifier of the subject resource to be updated, where it should be noted that the subject resource update request further includes the representation of the subject resource before the update in addition to the representation of the operation resource or the uniform resource identifier of the operation resource. In an embodiment, the method further includes receiving, by the service capability middleware, an operation resource create request, where the operation resource create request includes the representation of the operation resource associated with the subject resource and the uniform resource identifier of the operation resource set to which the operation resource associated with the subject resource belongs, and adding, by the service capability middleware, the representation of the operation resource to the operation resource set according to the uniform resource identifier of the operation resource set to which the operation resource belongs.

In addition, in the foregoing embodiment of the present invention, the representation of the operation resource may further include a type of the operation request, while the type of the constructed operation request may be any one of create, update, retrieve, and delete. When the type of the operation request is create or update, that is, when the operation request is used to create or update a representation of an object resource, the create operation request further needs to carry a representation of a new object resource for the operation resource. Specifically, the representation of the operation resource may further include an input parameter of the operation request, where the input parameter of the operation request may be a URI of a parameter resource, or the representation of the new object resource is directly saved in the input parameter of the operation request.

In an embodiment, when the input parameter is the uniform resource identifier of the parameter resource, the constructing the operation request for the object resource includes: retrieving, by the service capability middleware, the representation of the new object resource from the parameter resource that is pointed to by the uniform resource identifier of the parameter resource, and constructing the operation request that includes the uniform resource identifier of the object resource and the representation of the new object resource and that is for the object resource in the representation of the operation resource. In an embodiment, when the input parameter is the representation of the new object resource, the constructing the operation request for the object resource includes: constructing, by the service capability middleware, the operation request that includes the uniform resource identifier of the object resource and the representation of the new object resource and that is for the object resource in the representation of the operation resource.

In the foregoing embodiment of the present invention, before the service capability middleware retrieves the change result of the content of the subject resource stored in the service capability middleware, the method further includes: receiving, by the service capability middleware, an operation resource update request, where the operation resource update request includes a representation of a new operation resource. The representation of the new operation resource includes a representation of a dependency resource or a uniform resource identifier of a dependency resource. The method further includes updating, by the service capability middleware, the stored representation of the operation resource to the representation of the new operation resource. It should be noted that the operation resource update request further includes the representation of the operation resource before the update in addition to the representation of the dependency resource or the uniform resource identifier of the dependency resource. In an embodiment, the method further includes receiving, by the service capability middleware, a dependency resource create request, where the dependency resource create request includes a representation of a dependency resource and a uniform resource identifier of a dependency resource set to which the dependency resource belongs, saving, by the service capability middleware, the representation of the dependency resource to the dependency resource set according to the uniform resource identifier of the dependency resource set to which the dependency resource belongs, and adding the uniform resource identifier of the dependency resource set to the representation of the operation resource.

In the foregoing embodiment of the present invention, when the dependency resource exists, before the service capability middleware constructs the operation request for the object resource in the foregoing embodiment of the present invention, the method includes: retrieving, by the service capability middleware according to the representation of the operation resource, the representation of the dependency resource associated with the operation resource; retrieving, by the service capability middleware, a representation of a condition resource that is pointed to by a uniform resource identifier in the representation of the dependency resource; and determining, by the service capability middleware according to the representation of the condition resource, that a condition in the representation of the dependency resource is met.

In an embodiment, types of the foregoing dependency resource may be classified into a sufficient condition type and a necessary condition type, a dependency resource quantity is at least one, and before the service capability middleware constructs the operation request for the object resource in the representation of the operation resource, the method further includes: determining that a condition specified by at least one dependency resource of the sufficient condition type is met; or determining that conditions specified by all dependency resources of the necessary condition type are met.

That is, when further determining that the condition specified by the at least one dependency resource of the sufficient condition type is met, the service capability middleware constructs the operation request for the object resource in the representation of the operation resource. In an embodiment, when further determining that the conditions specified by all the dependency resources of the necessary condition type are met, the service capability middleware constructs the operation request for the object resource in the representation of the operation resource.

In an embodiment, the retrieving, by the service capability middleware according to the representation of the operation resource, the representation of the dependency resource associated with the operation resource, includes: retrieving, by the service capability middleware according to the representation of the dependency resource included in the representation of the operation resource, the representation of the dependency resource associated with the operation resource. In an embodiment, the retrieving, by the service capability middleware according to the representation of the operation resource, the representation of the dependency resource associated with the operation resource, includes: retrieving, by the service capability middleware according to the uniform resource identifier of the dependency resource included in the representation of the operation resource, the representation of the dependency resource associated with the operation resource. In an embodiment, the retrieving, by the service capability middleware according to the representation of the operation resource, the representation of the dependency resource associated with the operation resource, includes: retrieving, by the service capability middleware according to the uniform resource identifier, included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

That is, the association between the operation resource and the dependency resource may be established in three manners: the representation of the operation resource includes the representation of the dependency resource, the representation of the operation resource includes the uniform resource identifier of the dependency resource, and the representation of the operation resource includes the uniform resource identifier of the dependency resource set to which the dependency resource belongs.

In the foregoing embodiment of the present invention, it is determined that at least two operation resources are associated with the subject resource, where representations of the operation resources may further include priorities, and the constructing, by the service capability middleware, the operation request for the object resource in the representation of the operation resource may include: constructing, by the service capability middleware, an operation request for an object resource in the representation of each operation resource in sequence according to the priorities in the representations of the operation resources.

In the foregoing embodiment of the present invention, the representation of the operation resource may further include an operation execution result, and the method further includes: receiving, by the service capability middleware, an operation response returned by the device in which the object resource is located, and saving the operation response into the operation execution result in the representation of the operation resource. In an embodiment, the representation of the operation resource may further include an address reflecting an operation execution result and the operation execution result, and the method further includes: receiving, by the service capability middleware, an operation response returned by the device in which the object resource is located, retrieving, according to the address reflecting the operation execution result, an operation result corresponding to the operation request, and saving the operation result corresponding to the operation request into the operation execution result, where specifically, the address reflecting the operation execution result may be a URI of a resource, the corresponding resource may be accessed according to the URI, and the operation result corresponding to the operation request is retrieved.

Figure 2:
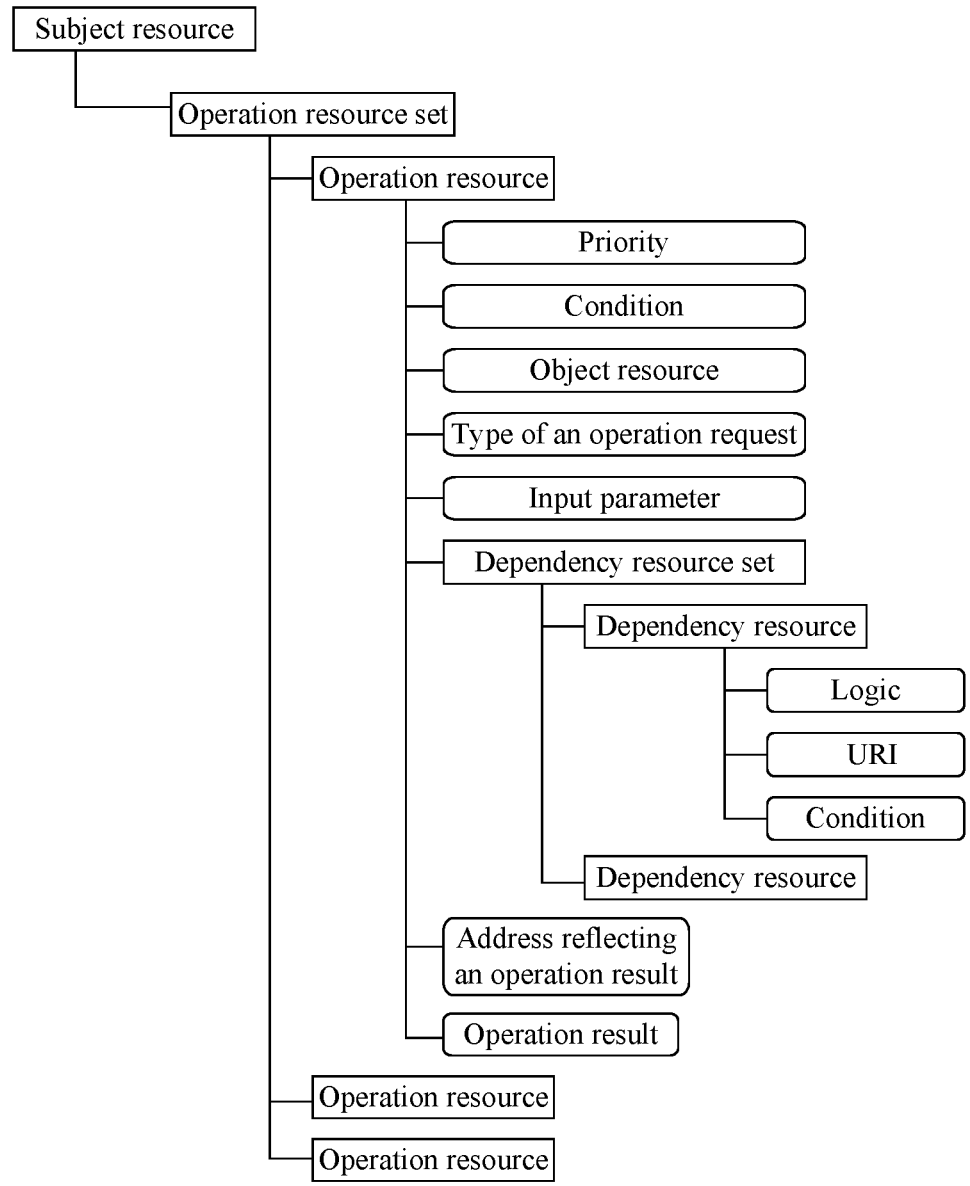
FIG. 2 is a schematic diagram of a resource structure according to an embodiment of the present invention.

The operation triggering method according to the present invention is hereinafter further described in detail in a specific embodiment. FIG. 2 is a schematic diagram of a resource structure according to an embodiment of the present invention. In this embodiment, a RESTful resource element structure is extended, and multiple operation resources are combined to constitute an operation resource set.

A relationship between a subject resource, an operation resource, and an operation resource set may be shown in FIG. 2, where a rectangular block represents a resource, a rounded rectangular block represents an attribute, and a black solid line indicates an association relationship between two resources or between a resource and an attribute. Resources and attributes in this embodiment represent only an exemplary division manner, and there may also be different division manners according to different application scenarios.

The subject resource may be any type of resource in a RESTful architecture. In this embodiment, the subject resource may be a resource that causes an operation triggering event.

The operation resource set includes one or more operation resources where each operation resource corresponds to one operation triggered by the subject resource. The operation resource set is associated with the subject resource, and a manner of indicating the association may be that a representation of the subject resource includes a URI of the operation resource set.

The operation resource indicates an operation. The operation resource may include a series of attributes and resources. As described above, a rounded rectangular block represents an attribute, that is, attributes of the operation resource are some or all of a priority, a condition (Rule), an object resource, a request type (Method), an input parameter (Input), an address reflecting an operation execution result (Output URI), and the execution result (Result). Likewise, as described above, a rectangular block represents a resource, that is, a resource in the operation resource is a dependency resource included in a dependency resource set (Dependencies). Specifically, the dependency resource may further include several attributes, for example, logic, URI, and/or a condition. One or more operation resources are included in the operation resource set, and an association with the subject resource is generated using the operation resource set. That is, if the representation of the subject resource includes the uniform resource identifier (URI) of the operation resource set, all operation resources in the operation resource set are operation resources associated with the subject resource. Therefore, when the subject resource changes, whether operations in the operation resources need to be executed is determined for all the operation resources in the operation resource set.

The priority indicates a priority of the operation resource. When multiple operation resources, for example, two or more than two, are associated with the subject resource, and operations in the multiple operation resources need to be executed, service capability middleware executes the operations in the operation resources in descending order of priority according to the priorities in representations of the operation resources.

The condition (Rule) indicates a condition required for executing an operation in the operation resource. When a change result of content of the subject resource associated with the operation resource meets the condition defined by Rule, the operation in the operation resource is executed.

The object resource may be indicated by using a URI of the object resource. When the change result of the content of the subject resource associated with the operation resource meets the condition defined by Rule in the representation of the operation resource, a common operation request for the object resource is sent to the URI of the object resource.

Method indicates a type of an operation request for the operation resource. In the RESTful architecture, generally, finite types of operation requests are defined. For example, for ETSI M2M, there are four types of operation requests, namely, create, retrieve, update, and delete.

Input indicates an input parameter of the operation request for the operation resource. In a RESTful method, operation requests of the update and create types need to carry the input parameter. In a create request, the input parameter carried in the create request is a representation of a new object resource, and the representation of the new object resource carried in the create request is used to create the entire object resource. In an update request, a representation of a new object resource carried in the update request is used to replace a representation of an original object resource. In an embodiment, a value of the input parameter in the operation resource may further be a URI, where the URI points to a parameter resource, and a representation of the parameter resource is the representation of the new object resource that needs to be carried in the operation request. The input parameter may also be a text segment used to directly save the representation of the new object resource. The input parameter is not mandatory to each operation resource. When the type of the operation request is delete or retrieve, because the operation request does not need to carry the input parameter, the representation of the operation resource of this type may not carry the input parameter.

Output URI indicates an address reflecting an operation execution result. In some scenarios, the operation execution result needs to be fed back using a status of another resource. For example, to determine whether a light is turned on, it is necessary to retrieve a value of a light sensor under the light, and an address of data of the light sensor is the address reflecting the operation execution result. The input parameter is also not mandatory to each operation resource. Representations of operation resources of some types may not include the input parameter.

Result indicates the operation execution result. It is a text segment. In a case in which Output URI exists, that is, when the operation execution result is reflected by a resource pointed to by Output URI, a representation of the resource retrieved from Output URI is saved in Result. When Output URI is not provided, an operation response that is fed back after the operation request is sent is saved in Result.

Dependencies indicate a dependency resource (Dependency) set. The dependency resource indicates execution of the operation resource further needs to depend on a dependency condition defined by a dependency resource.

Dependency indicates the dependency resource. Three attributes may be saved in the dependency resource. One is a URI, one is a condition (Rule), and the last one is logic. Specifically, the dependency resource is used to determine whether a representation of a condition resource pointed to by a URI in the dependency resource meets the condition defined by Rule in a representation of the dependency resource. Furthermore, if a parameter in Logic is AND, it indicates that meeting the condition defined by Rule in the representation of the dependency resource is a necessary condition for executing the sending of the operation request. If the parameter in Logic is OR, it indicates that meeting the condition defined by Rule in the representation of the dependency resource is a sufficient condition for executing the sending of the operation request.

Figure 3:
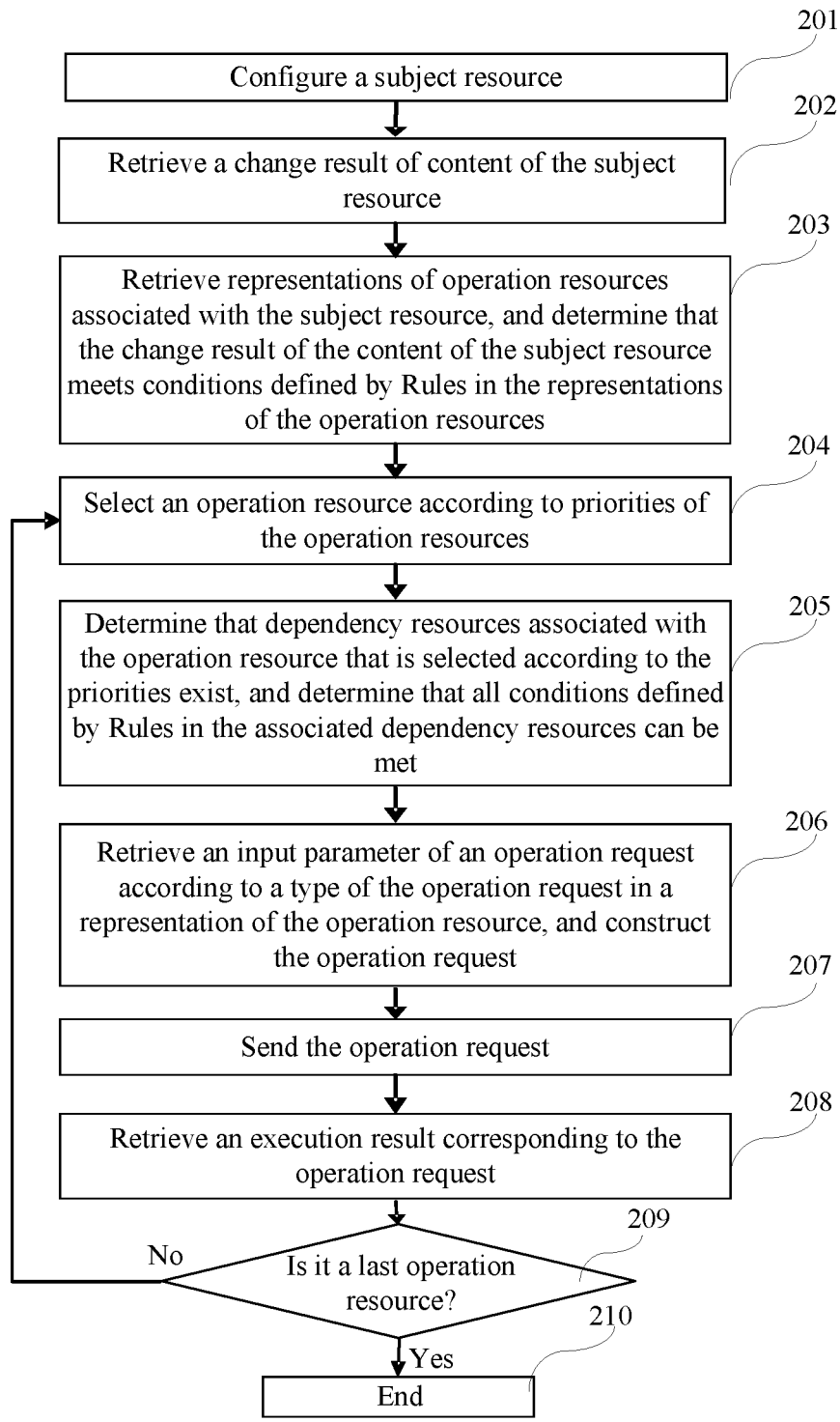
FIG. 3 is a schematic flowchart of an operation triggering method according to a specific embodiment of the present invention.

With reference to the resource structure diagram shown in FIG. 2, an embodiment of the present invention provides a complete flowchart of an operation triggering method. FIG. 3 is a schematic flowchart of an operation triggering method according to a specific embodiment of the present invention. As shown in FIG. 3, the method includes the following steps.

Step 201: Configure a subject resource, so that when content of the subject resource is changed, an operation on an object resource is triggered.

According to a service requirement of an M2M application, an application program may configure a subject resource, so that when a content of the subject resource is changed, one or more operations are performed on one or more object resources. A configuration method is to associate at least one operation resource with the subject resource. In an embodiment, the association may be established by using an operation resource set, or multiple operation resources may be directly associated with the subject resource, which is not limited herein in the embodiment of the present invention.

In an embodiment, for configuring the subject resource, it may be that the application program sends an operation resource create request to the operation resource set associated with the subject resource, so that an operation resource is created in the operation resource set. The operation resource create request defines what operation (Method) will be performed on which object resource when what change (Rule) of the subject resource occurs, an input parameter (Input) that needs to be carried in an operation request for the operation, and whether a condition defined by Rule in a dependency resource needs to be met before the operation is executed. In addition, it may also be that the application program sends the operation resource create request, and an entity (for example, platform middleware) that receives the operation resource create request creates the operation resource. It may further be that the application program directly sends the operation resource create request to middleware that stores the subject resource, and the middleware creates the operation resource in the representation of the subject resource. For a specific configuration process, reference may be made to an embodiment shown in FIG. 4.

Step 202: Retrieve a change result of the content of the subject resource.

The subject resource may be any resource stored in service capability middleware of an M2M system. In an embodiment, the subject resource may be a resource that causes an operation triggering event. For example, in an operation triggering event of turning on and off an air conditioner caused by an indoor temperature change, a resource that completes indoor temperature detection is the subject resource. In an embodiment, the content of the subject resource may be a text segment, a database record, or a file that is stored in the service capability middleware and has a specific structure. The stored text segment and the like may be changed into a data structure by means of a deserialization process. The representation of the subject resource may also be a data structure that is directly saved in a memory of the service capability middleware.

The change of the content of the subject resource may be caused by any situation. For example, the content of the subject resource may be changed by request sending by another application, or the content of the subject resource is changed by a process in the service capability middleware. The service capability middleware that stores the subject resource detects the change result of the content of the subject resource by listening on a program of the subject resource.

Step 203: Retrieve representations of operation resources associated with the subject resource, and determine that the change result of the content of the subject resource meets conditions defined by rules in the representations of the operation resources.

As shown in FIG. 2, the subject resource is associated with the operation resources using the operation resource set. [oLoo] However, in this embodiment, it may also be that the representation of the subject resource includes the representation of each operation resource in FIG. 2, or the URI of each operation resource in FIG. 2, or the URI of the operation resource set to which the operation resources in FIG. 2 belong. The operation resource set is a resource of a set type and includes at least one operation resource. Each operation resource includes a Rule attribute that defines a condition that the change result of the content of the subject resource associated with the operation resource needs to meet. The service capability middleware performs determining, one by one according to the change result of the content of the subject resource, on conditions in rules of the operation resources associated with the subject resource, and finally selects those operation resources in which conditions in rules are met. For a specific implementation process of step 203, reference may be made to an embodiment shown in FIG. 10.

Step 204: For the operation resources that are associated with the subject resource and determined in the foregoing step, select an operation resource according to priorities of the operation resources.

A priority attribute is defined in an operation resource and indicates a priority of the operation resource. In an embodiment, the priority may be indicated in a form of a number, where a greater number indicates a higher priority, or in other forms. Importance and a sequence of the operation resources are arranged using the priorities.

In an embodiment, in step 203, it is determined that at least two operation resources are associated with the subject resource, and the change result of the content of the subject resource meets conditions in rules in the operation resources. Then in this step, the service capability middleware constructs an operation request for an object resource in a representation of each operation resource in sequence according to the priorities in the representations of the operation resources. In this manner, an operation described in each operation resource can be executed in sequence.

Step 205: Determine that dependency resources associated with the operation resource that is selected according to the priorities in step 204 exist, and determine that all conditions defined by rules in the associated dependency resources can be met.

In an embodiment, for the operation resource selected in step 204, it is determined that the dependency resources associated with the operation resource exist. For example, the dependency resources associated with the operation resource may be representations of the dependency resources included in the representation of the operation resource (the dependency resources as shown in FIG. 2), or may be an identifier or identifiers of one or more dependency resources included in the representation of the operation resource or an identifier of a dependency resource set included in the representation of the operation resource, which is not limited herein in the embodiment of the present invention.

A dependency resource includes three attributes: URI, Logic, and Rule. After it is determined that the dependency resources associated with the operation resource exist, the determining that all conditions defined by rules in the dependency resources can be met includes: retrieving, according to a URI of a dependency resource, a representation of a condition resource indicated by the URI; determining whether the representation of the condition resource can meet a condition defined by Rule in the dependency resource; if the representation of the condition resource can meet the condition defined by Rule in the dependency resource, further checking whether a type of the dependency resource defined in Logic is a sufficient condition type or a necessary condition type; if it is the necessary condition type, continuing to check whether conditions defined by rules in other unchecked dependency resources can be met; and if it is the sufficient condition type, step 206 is executed directly. For a specific implementation process of this step, reference may be made to an embodiment shown in FIG. 14.

Step 206: Retrieve an input parameter of an operation request according to a type of the operation request in a representation of the operation resource selected in step 204, and construct the operation request.

In an embodiment, in this step, first, it is determined that the type of the operation request defined by Method in the representation of the operation resource is create or update. The input parameter of the operation request is retrieved according to a value of Input in the operation resource. The input parameter of the operation request is a representation of an object resource to be created or a representation of an object resource to be updated. When Input includes a URI, a representation of a resource indicated by the URI needs to be retrieved by using a retrieve request and used as the representation of the new object resource. The representation of the new object resource may also be saved directly as the value of Input. In this case, the representation of the new object resource is directly used to construct the operation request.

The operation request to be sent is constructed according to the type of the operation request, the object resource, and the input parameter defined in the operation resource. For a specific implementation process of step 206, reference may be made to an embodiment shown in FIG. 11.

Step 207: Send the operation request constructed in step 206 to a URI of an object resource, and receive an operation response returned by a device in which the object resource is located. In an embodiment, interaction between platform middleware that stores the subject resource and the device that stores the object resource may be performed by using a standard RESTful interface.

Step 208: According to Output URI in the representation of the operation resource that is currently executed, retrieve an execution result corresponding to the operation request, and save it to Result.

In an embodiment, when the representation of the operation resource includes Output URI, the execution result corresponding to the operation request needs to be retrieved from a resource indicated by Output URI. After the request is sent in step 207, the service capability middleware that stores the subject resource further sends a retrieve request to Output URI to retrieve a representation of the resource indicated by Output URI, and saves the retrieved representation of the resource indicated by Output URI into the execution result attribute in the representation of the operation resource.

Figure 15:
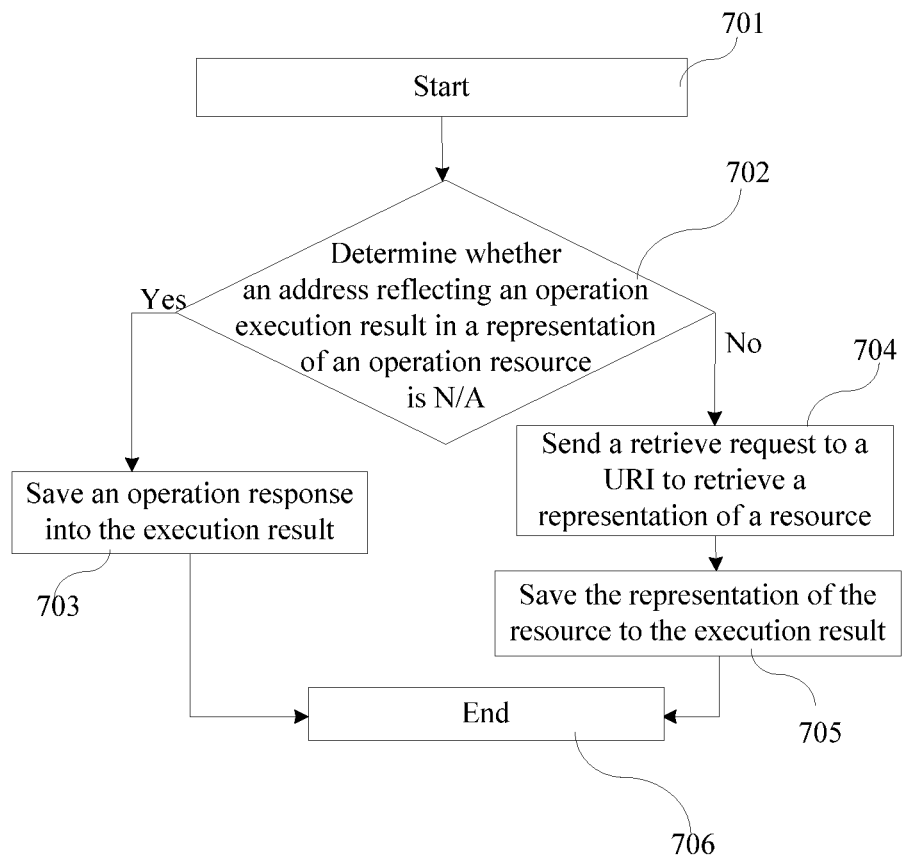
FIG. 15 is a schematic flowchart of retrieving an operation result according to an embodiment of the present invention.

If Output URI is not provided in the representation of the operation resource, it indicates that the execution result corresponding to the operation request does not need to be reflected by a representation of another resource. In this case, after step 207 is executed, the operation response corresponding to the operation request in step 207 is received. Content of the operation response is saved into the execution result in the representation of the operation resource. For a specific implementation process of step 208, reference may be made to an embodiment shown in FIG. 15.

Step 209: Determine whether the selected resource is a last operation resource. If the selected resource is the last operation resource, that is, if it is determined that operations of the multiple operation resources selected in step 203 have been executed, go to step 210; otherwise, return to step 204. In this step, determining whether an operation of an operation resource is executed may be determining whether a corresponding operation response is received.

Step 210: End.

Figure 4:
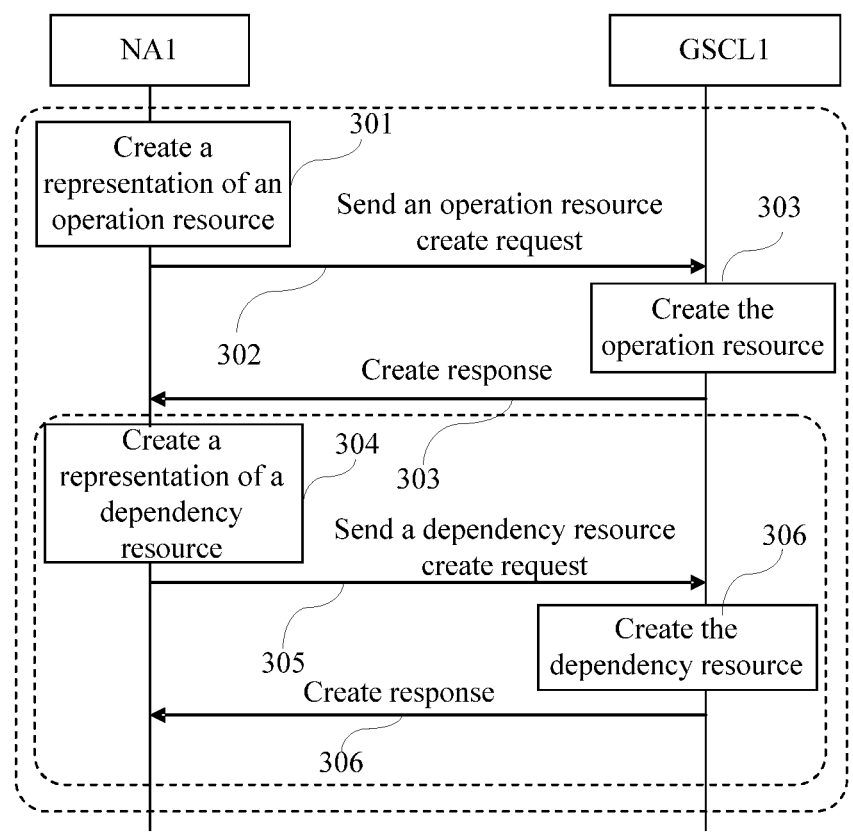
FIG. 4 is a schematic flowchart of configuring operation triggering according to an embodiment of the present invention.
Figure 7:
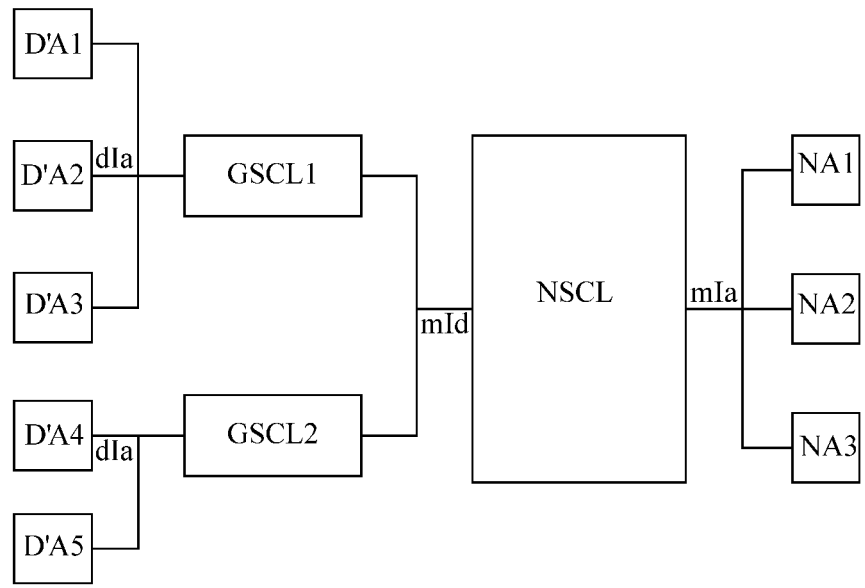
FIG. 7 is an architecture diagram of a system according to an embodiment of the present invention.

FIG. 4 is a schematic flowchart of configuring operation triggering according to an embodiment of the present invention. In this embodiment, an operation resource is configured for a temperature value of a temperature sensor, so that turning on an air conditioner is triggered when a temperature is higher than 30° C. and a family member is at home. A system architecture diagram thereof may be shown in FIG. 7.

An M2M network application (NA) server registers various M2M applications (such as electricity meter reading and intelligent traffic) with a network service capability layer (NSCL) of an M2M service platform by using a mIa interface. The M2M service platform accesses an M2M device using a mId interface to collect data, and further performs remote device management on the M2M device by using the interface. An M2M device d is connected to the NSCL of the M2M service platform using an M2M gateway. An M2M device D is connected to the NSCL of the M2M service platform using the mId interface.

An M2M device D' is a conventional device that does not comply with an ETSI M2M standard. The M2M device D is a device that complies with the ETSI M2M standard. The M2M device D has a service capability layer (SCL) that is defined by the ETSI M2M standard. The M2M device D' does not have the SCL defined by the ETSI M2M standard.

By using a gateway interworking proxy function (GIP), the M2M gateway interworks with the conventional M2M device d and M2M device D' in a wireless or wired communications manner (for example, ZigBee, Bluetooth, DLMS/COSEM, Zwave, BACnet, ANSI C12, and mBus). The mId interface between the M2M gateway or M2M device D and the M2M platform generally uses wired or wireless wide area local area network communication manners (for example, xDSL, HFC, satellite, GERAN, UTRAN, E-UTRAN, WLAN, and WiMAX).

A D'A1 is a temperature sensor application. The D'A1 continuously saves temperature values to a temperate resource in a resource tree of a gateway service capability layer GSCL1. A URI of the subject resource Temperature resource is http://gscl1/temperature. An NA1 is a smart home application program. The NA1 is used to create a representation of an operation resource associated with the temperature resource. A D'A5 is an air conditioner application program. The D'A5 controls an air conditioner by monitoring a representation value of an air condition (Air- Condition) resource in a GSCL2. For example, the D'A5 turns on the air conditioner when the representation value of the air condition resource is ON, and turns off the air conditioner when the representation value of the air condition resource is OFF. A URI of the air condition resource is http://gscl2/airCondition.

An NA2 is a host location application program. The application program saves location information of a host to a host location (HostLocation) resource in the NSCL. A URI of the host location resource is http://nscl/hostLocation.

When a representation value of the temperature resource is higher than 30 degrees Celsius, the GSCL1 needs to send a request to the GSCL2 to change the representation of the air condition resource to ON, thereby achieving an objective of turning on the air conditioner. The NA1 completes this process by creating the representation of the operation resource associated with the temperature resource.

As shown in FIG. 4, the following steps are included.

Step 301: Create a representation of an operation resource.

Figure 5:
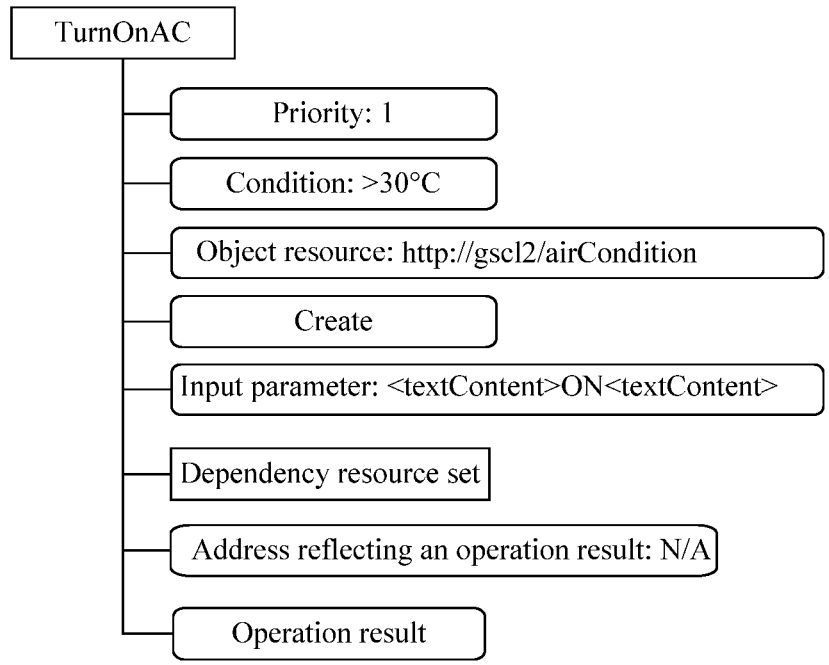
FIG. 5 is architecture diagram 1 of an operation resource TurnOnAC according to an embodiment of the present invention.

The NA1 on the network application server constructs an operation resource for turning on an air conditioner (TurnOnAC), which is used to express a condition for triggering the operation of turning on an air conditioner. According to a requirement of service logic, this step may be repeated multiple times to create representations of multiple operation resources. An architecture of the operation resource TurnOnAC is shown in FIG. 5.

Step 302: Send an operation resource create request.

After step 301, the NA1 on the network application server encapsulates the constructed representation of the operation resource TurnOnAC according to a standard of a RESTful architecture on an interface, and sends it to the gateway service capability layer GSCL1. The GSCL1 creates the operation resource TurnOnAC in an operation resource set associated with the temperature resource, where a URI of the operation resource set is http://gsclh/temperature/Operations. That is, the operation resource create request carries the URI of the operation resource set and the constructed representation of the operation resource. If the operation resource set associated with the subject resource, for example, the temperature resource, does not exist, the operation resource create request may carry the URI of the temperature resource or a URI of the GSCL1, and the GSCL1 creates the operation resource. For example, the GSCL1 creates the operation resource in the representation of the temperature resource, or creates the operation resource elsewhere, and includes a URI of the operation resource into the representation of the temperature resource. The embodiment of the present invention is described using an example in which the operation resource create request carries the URI of the operation resource set.

Step 303: Create the operation resource.

After receiving the operation resource create request sent by the NA1, the gateway service capability layer GSCL1 creates, in the operation resource set (Operations) associated with the temperature resource, the operation resource TurnOnAC in the operation resource create request, that is, adds the representation of the operation resource TurnOnAC to the operation resource set, so that the operation resource TurnOnAC and the temperature resource are associated. After completing creating the operation resource TurnOnAC, the gateway service capability layer returns a create response to the NA1.

Step 304: Create a representation of a dependency resource.

Figure 6:
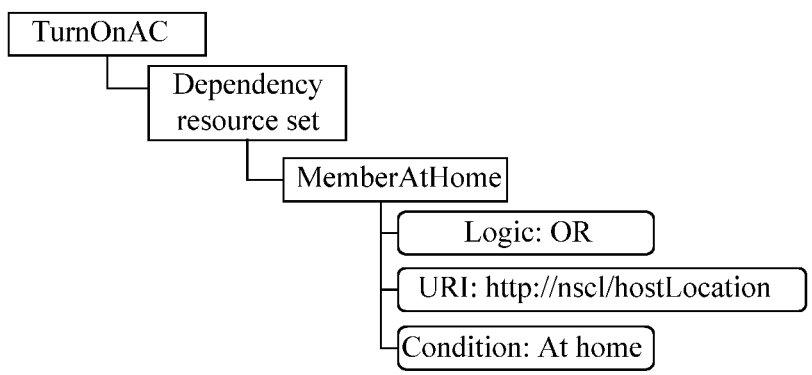
FIG. 6 is an architecture diagram of a dependency resource MemberAtHome according to an embodiment of the present invention.

According to service requirements, the NA1 begins to create dependency resources associated with different operation resources. In this embodiment, whether to turn on the air conditioner depends on a location of the host, that is, a status of the host location resource HostLocation, and the host location resource HostLocation is the dependency resource associated with the operation resource TurnOnAC. Therefore, a dependency resource MemberAtHome is created, and a representation of the dependency resource MemberAtHome may indicate whether a member is at home. As shown in FIG. 6, in the dependency resource MemberAtHome, a value of Logic is OR, indicating that a type of the dependency resource is a sufficient condition type; a URI is the URI of the host location resource; a condition Rule is that the status of a host location is at home.

Step 305: Send a dependency resource create request.

After step 304, the NA1 encapsulates the constructed representation of the dependency resource MemberAtHome according to a standard of the RESTful architecture on an interface, and sends it to the gateway service capability layer GSCL1. The GSCL1 creates the dependency resource MemberAtHome in a dependency resource set associated with the operation resource TurnOnAC, where a URI of the dependency resource set is http://gscl1/temperature/Operations/TurnOnAC/Dependencies. That is, the dependency resource create request includes the URI of the dependency resource set. In addition, referring to step 302, the dependency resource create request may further include the URI of the operation resource to indicate that no dependency resource or dependency resource set exists in the operation resource, so that the GSCL1 directly saves the representation of the dependency resource into the operation resource TurnOnAC. This embodiment is described using an example in which the dependency resource create request carries the URI of the dependency resource set. In addition, the dependency resource create request may be sent as defined in the standard.

Step 306: Create the dependency resource.

After receiving the dependency resource create request sent by the NA1, the GSCL1 adds the representation of the dependency resource MemberAtHome in the dependency resource create request to the dependency resource set associated with the operation resource TurnOnAC. That is, the GSCL1 associates the dependency resource MemberAtHome with the dependency resource set, and thereby also associates the dependency resource MemberAtHome with the operation resource TurnOnAC. After the dependency resource is created, a create response is returned.

On a basis of the embodiment shown in FIG. 4, when the temperature is higher than 30 degrees Celsius, windows further need to be closed in addition to turning on the air conditioner, that is, two operations are triggered. The NA1 may define that a priority of closing the windows is higher than a priority of turning on the air conditioner, that is, the windows need to be closed before the air conditioner is turned on. The system architecture in FIG. 7 further includes a controller application program D'A4 for closing windows. The D'A4 controls the windows by monitoring a value of a Window resource in the gateway service capability layer GSCL2. For example, when a representation of the Window resource is ON, the windows are opened, and when the representation of the Window resource is OFF, the windows are closed. A URI of the Window resource is http://gscl2/window.

Figure 8:
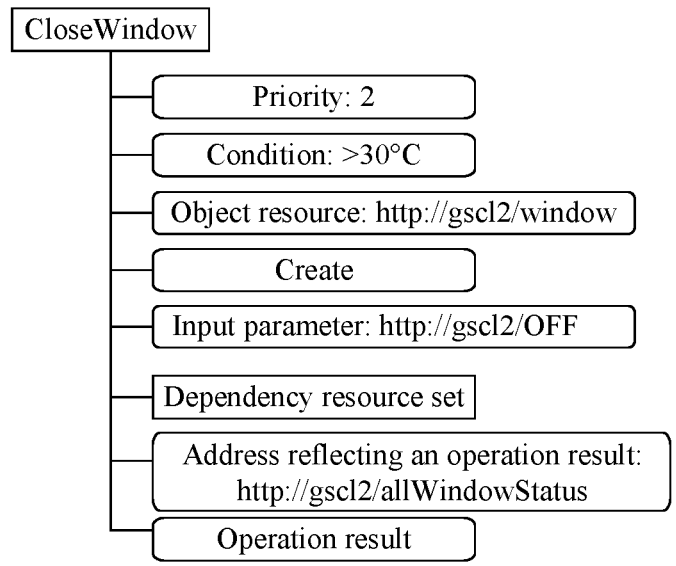
FIG. 8 is architecture diagram 1 of an operation resource CloseWindow according to an embodiment of the present invention.

An architecture diagram of an operation resource CloseWindow for closing windows may be shown in FIG. 8. A value of an input parameter Input of the operation resource CloseWindow is a URI, while an input parameter is directly saved in Input of the TurnOnAC. Output URI of the operation resource CloseWindow is http://gscl2/allWindowStatus, that is, a URI of an allWindowStatus resource. A representation of the allWindowStatus resource indicates a closing status of windows in a house. ON indicates that a window is opened. OFF indicates that all the windows are closed.

Figure 9:
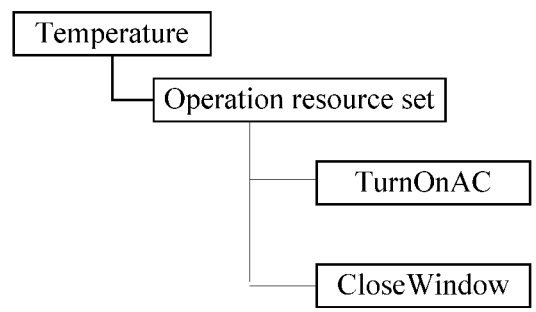
FIG. 9 is a schematic diagram of an association between a subject resource and operation resources according to an embodiment of the present invention.

The operation resource CloseWindow and the operation resource TurnOnAC are separately associated with the subject resource Temperature. A schematic diagram of a specific association may be shown in FIG. 9.

When the representation of the temperature resource is higher than 30 degrees, the two operations of the operation resource TurnOnAC and operation resource CloseWindow are triggered. In this embodiment, the temperature resource Temperature is saved in the gateway service capability layer GSCL1, and both the operation resource TurnOnAC and operation resource CloseWindow are saved in the gateway service capability layer GSCL2. A specific process thereof includes steps shown in FIG. 10.

Step 401: The GSCL1 retrieves a change result of content of the temperature resource.

In an embodiment, the temperature resource Temperature is used as a subject resource, and the content of the temperature resource is changed. The change result of the content retrieved by the GSCL1 is 31 degrees.

Step 402: The GSCL1 determines operation resources associated with the temperature resource Temperature.

Specifically, an association manner in this embodiment may be that the representation of the temperature resource includes a URI of an operation resource set to which the operation resource TurnOnAC and operation resource CloseWindow belong. In this embodiment, an architecture diagram of the temperature resource may be shown in FIG. 9. In this step, the determined operation resources associated with the temperature resource are TurnOnAC and CloseWindow.

Step 403: Determine that the change result of the content of the temperature resource meets conditions defined by rules in representations of the operation resources TurnOnAC and CloseWindow determined in step 402. Rule defines a method for matching representations of resources. In ETSI M2M, Rule is a filterCriteria attribute defined by the ETSI M2M standard. In this embodiment, the conditions defined by the rules in the representations of the TurnOnAC and CloseWindow are >30° C., and the representation of the temperature resource is changed to 31° C. Therefore, the conditions defined by the rules in the TurnOnAC and CloseWindow are both met, and the two operation resources are selected in this step. In subsequent steps, corresponding operations are executed on the selected operation resources one by one.

Step 404: Both the representations of the two operation resources include priorities of the operation resources. In this embodiment, the priority of the operation resource CloseWindow is 2, and the priority of the operation resource TurnOnAC is 1. Therefore, the priority of the operation resource CloseWindow is higher than the priority of the operation resource TurnOnAC. Therefore, in this step, choose to execute the operation corresponding to the operation resource CloseWindow of the higher priority first.

Step 405: Determine that a condition defined by Rule in a dependency resource associated with the operation resource CloseWindow is met. For detailed steps, reference may be made to an embodiment shown in FIG. 14.

Step 406: Retrieve an input parameter required for creating an operation request for the operation resource CloseWindow. For detailed steps, reference may be made to an embodiment shown in FIG. 11.

Step 407: According to a request type (Method) and an object resource included in the representation of the operation resource CloseWindow and the input parameter retrieved in step 406, construct the operation request to be sent. In this embodiment, the type of the operation request is create, a URI of the object resource is http://gscl3/window, and the retrieved input parameter (Input) is OFF. In the ETSI M2M standard, an operation request transmitted on a standard RESTful interface may be constructed according to the foregoing attributes.

Step 408: Send the operation request constructed in step 407 to a GSCL3. The operation request may be sent using a standard RESTful interface defined in an M2M system. Step 408 may also include receiving an operation response that is returned by the GSCL3 after the operation in the operation request, for example, closing a window, is completed by a window controller.

Step 409: Retrieve an execution result corresponding to the operation request. For detailed steps, reference may be made to an embodiment shown in FIG. 15.

Step 410: With respect to the priorities of the operation resources selected in step 403, select a remaining operation resource of a highest priority, and continue to execute the following steps. In this embodiment, the operation resource TurnOnAC is selected in this step.

Step 411: Determine that a condition defined by Rule in a representation of a dependency resource associated with the operation resource TurnOnAC is met. For detailed steps, reference may be made to the embodiment shown in FIG. 14.

Step 412: Retrieve an input parameter required for creating an operation request for the TurnOnAC. For detailed steps, reference may be made to the embodiment shown in FIG. 11.

Step 413: According to a type (Method) and an object resource included in the operation resource TurnOnAC and the input parameter retrieved in step 412, construct the operation request to be sent. In this embodiment, the type of the operation request is create, a URI of the object resource is http://gscl2/airCondition, and the retrieved input parameter (Input) is ON. With reference to the ETSI M2M standard, an operation request transmitted on a standard RESTful interface may be constructed according to the foregoing attributes.

Step 414: Send the operation request created in step 413 to the GSCL2, and receive an operation response. The operation request may be sent using a standard RESTful interface defined in the M2M system.

Step 415: Retrieve an operation execution result. For detailed steps, reference may be made to the embodiment shown in FIG. 15.

Figure 10:
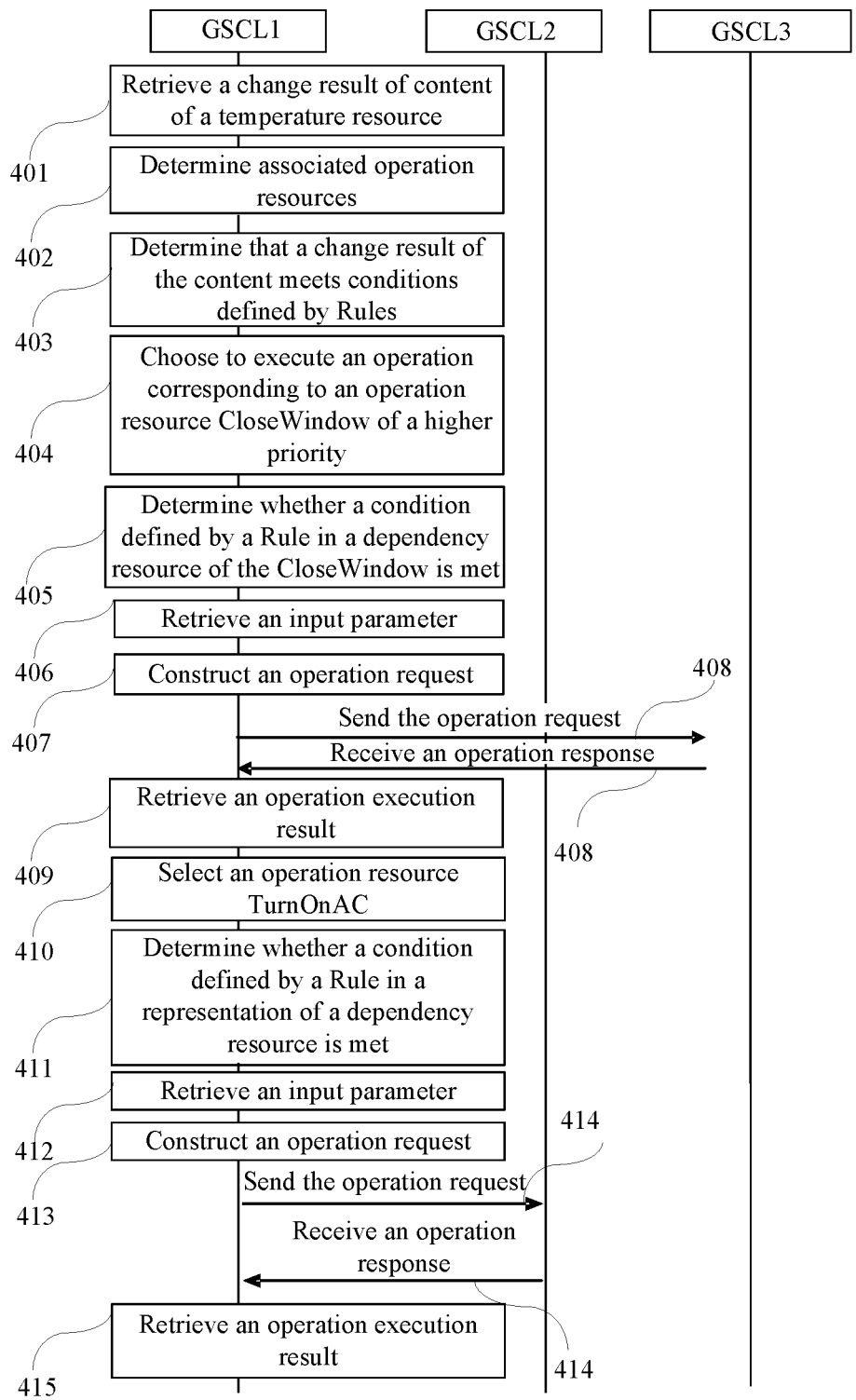
FIG. 10 is a schematic flowchart of operation triggering according to an embodiment of the present invention.

In the embodiment shown in FIG. 10, the GSCL2, GSCL1, and GSCL3 may be a same GSCL, or may be different GSCLs, which is not limited herein in the embodiment of the present invention.

Figure 11:
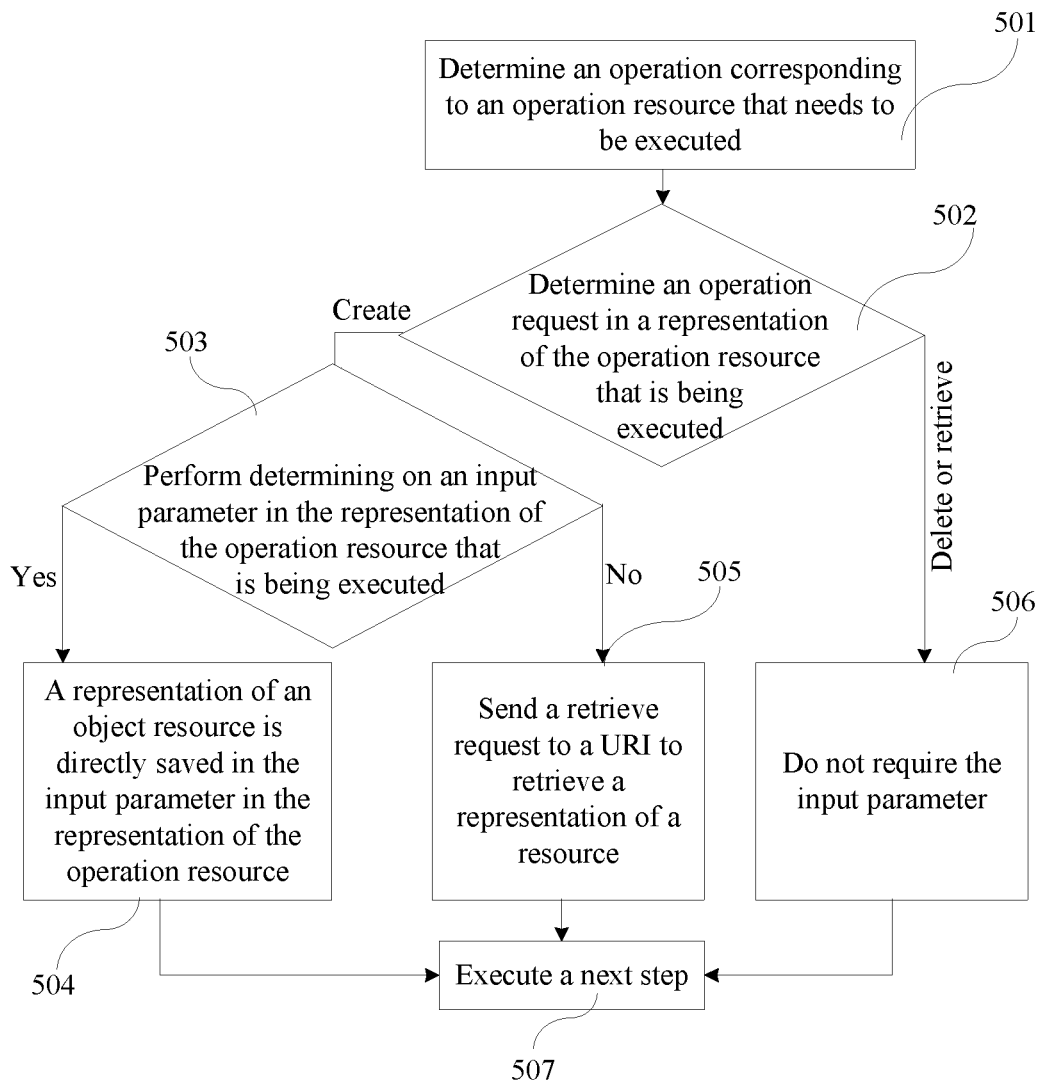
FIG. 11 is a schematic flowchart of retrieving an input parameter according to an embodiment of the present invention.

Input included in a representation of an operation resource indicates an input parameter required for constructing an operation request. Operation requests of the types of operation requests specified by the RESTful architecture, delete and retrieve, do not require an input parameter, but operation requests of create and update need to carry representations of object resources for creating an object resource and updating an object resource, respectively. In step 406 and step 412 in the foregoing embodiment shown in FIG. 10, the input parameters are retrieved when the operation requests for the operation resources CloseWindow and TurnOnAC are constructed separately. A specific process thereof is shown in FIG. 11, where a URI saved in the input parameter is http://gscl3/OFF, and service capability middleware in which a resource pointed to by the URI is located is the GSCL3. As shown in FIG. 11, a process for determining whether an input parameter needs to be retrieved may include the following steps.

Step 501: Start the process. Determine an operation corresponding to an operation resource that needs to be executed. For example, the operation corresponding to the operation resource CloseWindow or the operation corresponding to the operation resource TurnOnAC, may need to be executed.

Step 502: Determine an operation request type (Method) in a representation of the operation resource that is being executed. In this embodiment, both the request types (Method) in the representations of the operation resources CloseWindow and TurnOnAC are create, and step 503 is executed. In addition, if the request type is delete or retrieve, an input parameter does not need to be considered when an operation request is constructed, and step 506 may be executed directly.

Step 503: Determine whether a URI of a parameter resource is saved in an input parameter Input in the representation of the operation resource that is being executed.

The URI is in a fixed format, and made up of parts such as a schema, a host, a port, and a path. For details, reference may be made to IETF RFC 3305. The URI saved in the input parameter Input indicates that the input parameter required for constructing the operation request is a representation of the parameter resource pointed to by the URI. For example, for the operation resource CloseWindow in this embodiment, the URI http://gscl2/OFF is saved in the input parameter Input in the representation of the operation resource. If the URI is saved in the input parameter, the process proceeds to step 505. If no URI is saved in the input parameter, but a representation of a resource is directly saved as a representation of a new object resource, the process proceeds to step 504.

Step 504: Construct an operation request of the create type, and directly use a representation of an object resource saved in the input parameter, as content of the operation request. For example, <textContent>ON<textContent> is saved in the input parameter in the representation of the operation resource TurnOnAC, and the text segment is the input parameter that is required for creating the operation request for the operation resource TurnOnAC.

Step 505: When the input parameter in the representation of the operation resource that is being executed is the URI, a retrieve request needs to be sent to the URI to retrieve a representation of a resource pointed to by the URI as the representation of the new object resource. For example, the URI saved in the input parameter Input in the representation of the operation resource CloseWindow is http://gscl3/OFF, which indicates that the GSCL1 (the service capability middleware in which the Temperature is located) needs to send a retrieve request (Retrieve) to the GSCL3 (the service capability middleware in which http://gscl3/OFF is located) to retrieve a representation of a resource indicated by http://gscl3/OFF as the representation of the new object resource.

Step 506: The input parameter is not required for constructing an operation request of the delete or retrieve type, and the process directly proceeds to step 507.

Step 507: Execute the steps next to step 406 and step 412 in the embodiment shown in FIG. 10.

In step 405 and step 411 in the embodiment shown in FIG. 10, before the operations are executed, it is necessary to determine whether the conditions defined by the rules in the representations of the dependency resources of the operation resources are met. In this embodiment, it is to determine whether a condition defined by Rule in a representation of each dependency resource of the operation resources TurnOnAC and CloseWindow can be met. In the system architecture shown in FIG. 7, a D'A2 is a bedroom window sensor application program used to detect whether a window in a bedroom is closed, and this application program uses a representation of a BedroomWindowStatus resource in the GSCL1 to indicate a current status of the window in the bedroom. A URI of the BedroomWindowStatus resource is http://gscl1/bedroomWindowStatus. A D'A3 is a living room window sensor application program used to detect whether a window in a living room is closed, and this application program uses a representation of a LivingroomWindowStatus resource in the GSCL1 to indicate a current status of the window in the living room. A URI of the LivingroomWindowStatus resource is http://gscl1/livingroomWindowStatus. In the current embodiment, when the representation of the temperature resource is higher than 30° C., the windows needs to be closed before the air conditioner is turned on. Before the operation of closing the windows is executed, it is necessary to determine whether the windows in the living room and bedroom have been closed. That is, execution of the operation of the operation resource CloseWindow further depends on the representations of the two dependency resources BedroomWindowStatus and LivingroomWindowStatus. If one window is not closed, the operation of closing a window needs to be executed.

Figure 12:
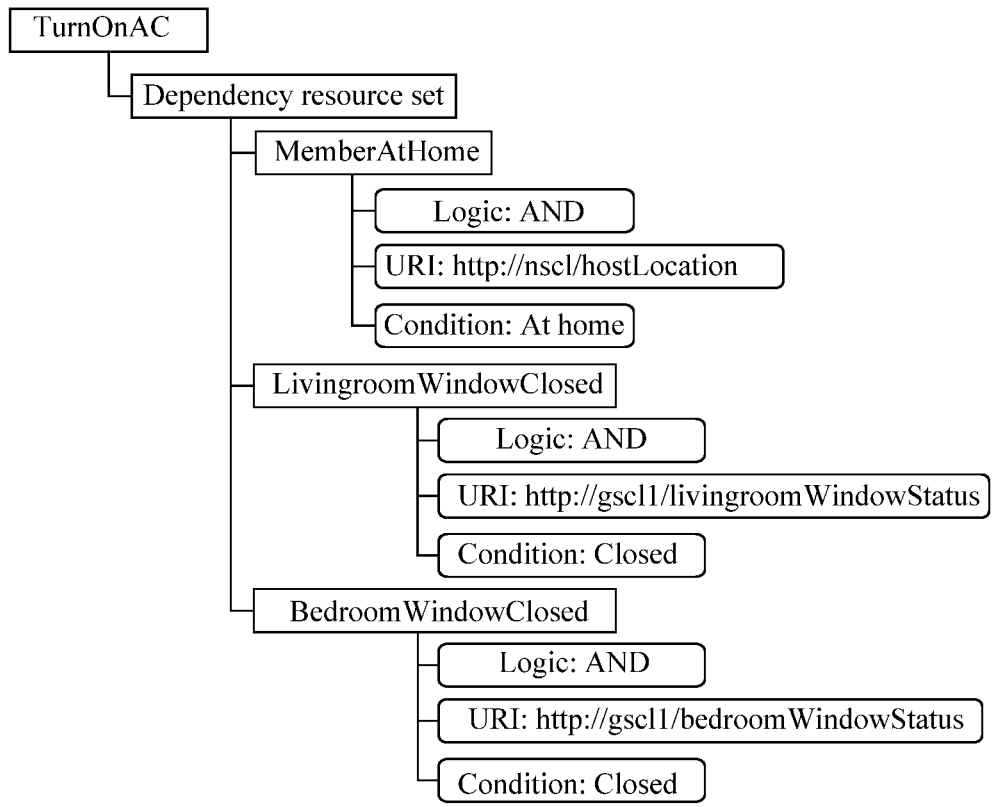
FIG. 12 is architecture diagram 2 of an operation resource TurnOnAC according to an embodiment of the present invention.
Figure 13:
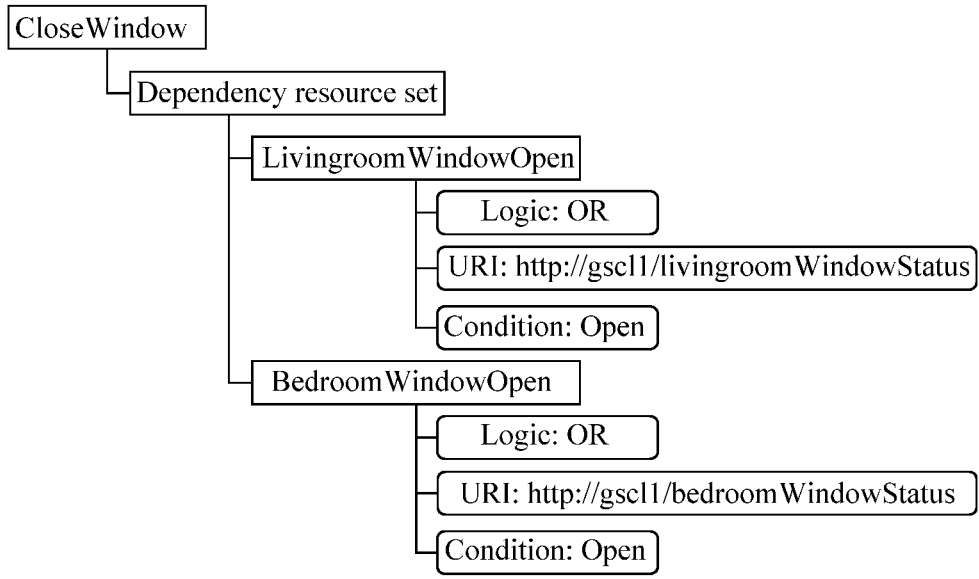
FIG. 13 is architecture diagram 2 of an operation resource CloseWindow according to an embodiment of the present invention.

Meanwhile, the operation of turning on the air conditioner is executed only after it is ensured that all the windows are closed and it is determined that the host is at home. In summary, the architecture of the dependency resource sets of the updated operation resource TurnOnAC for turning on the air conditioner and the updated operation resource CloseWindow for closing the windows may be shown in FIG. 12 and FIG. 13.

Figure 14:
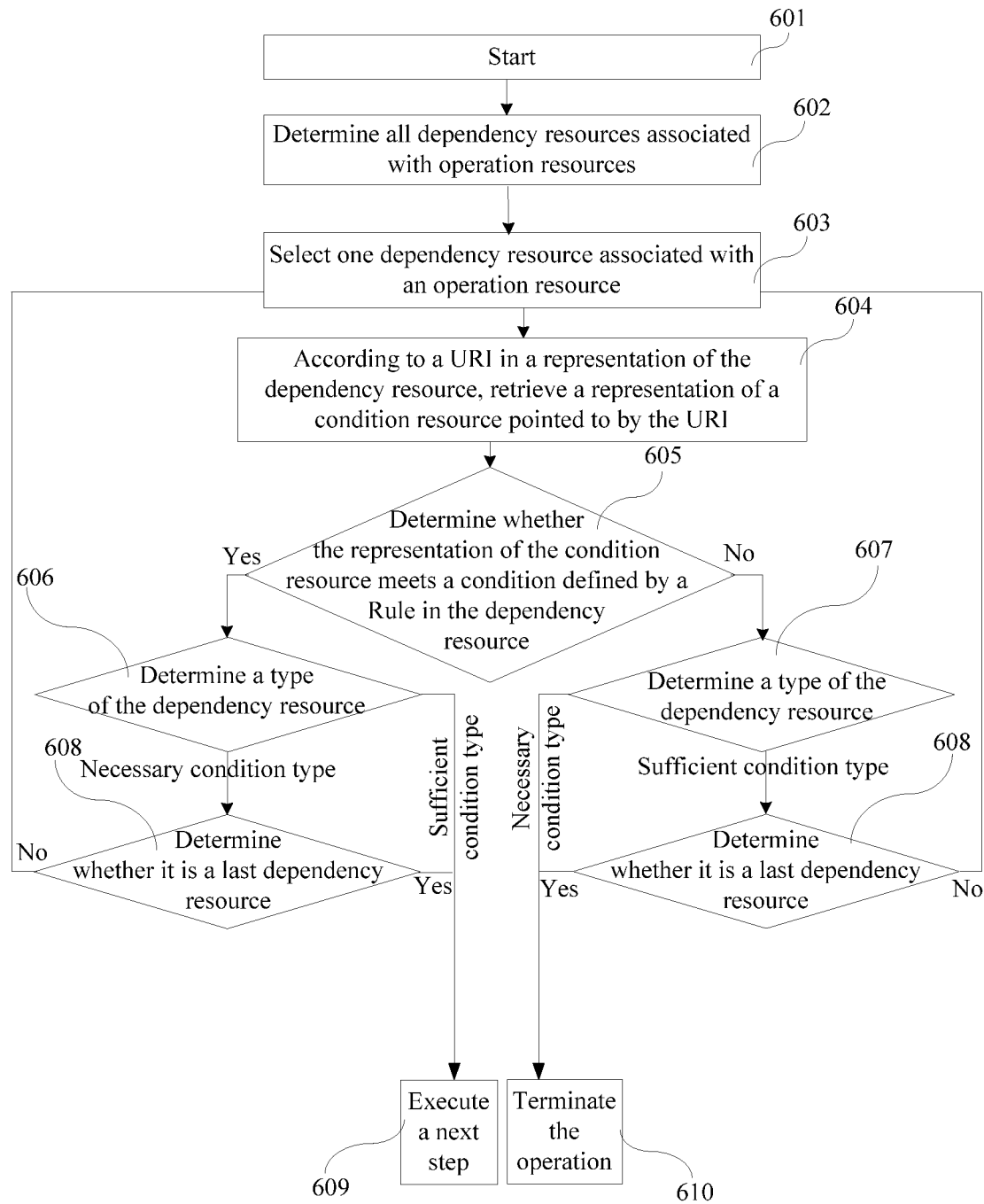
FIG. 14 is a schematic flowchart of performing condition detection according to a dependency resource according to an embodiment of the present invention.

For each operation resource, determining whether a condition defined by Rule in a representation of a dependency resource associated with the operation resource may include the steps shown in FIG. 14.

Step 601: Start.

Step 602: The GSCL1 determines all the dependency resources associated with the operation resources, where the dependency resources associated with the operation resource TurnOnAC include MemberAtHome, LivingroomWindowClosed, and BedroomWindowClosed, and the dependency resources associated with the operation resource CloseWindow include LivingroomWindowOpen and BedroomWindowOpen.

Step 603: Select one dependency resource associated with each operation resource in sequence, and execute step 604 to step 610, discussed below, for each dependency resource.

Step 604: According to a URI in the representation of the dependency resource, retrieve a representation of a condition resource pointed to by the URI; for example, according to http://nscl/hospLocation, and retrieve a representation of a condition resource pointed to by the URI, that is, retrieve the location of the host.

Step 605: Determine whether the representation of the condition resource meets the condition defined by Rule in the dependency resource. If the condition is met, execute step 606; otherwise, execute step 607.

In this embodiment, assuming that the location of the host is at home, the representation of the condition resource meets the condition defined by Rule in the dependency resource.

Step 606: Determine whether a type of the dependency resource is the sufficient condition type or the necessary condition type. If it is the sufficient condition type, execute step 609; if it is the necessary condition type, execute step 608.

In this embodiment, the type of the dependency resource MemberAtHome is AND, that is, the necessary condition type, and therefore, it is further necessary to determine whether a condition in another dependency resource is met.

Step 607: Determine whether a type of the dependency resource is the sufficient condition type or the necessary condition type. If it is the necessary condition type, execute step 610; if it is the sufficient condition type, execute step 608.

Step 608: Determine whether the dependency resource is a last dependency resource. If the dependency resource is not the last dependency resource, execute step 603. If the dependency resource is the last dependency resource, there are two cases. If it is determined in step 605 that the representation of the condition resource meets the condition defined by Rule in the dependency resource, execute step 609. If it is determined in step 605 that the representation of the condition resource does not meet the condition defined by Rule in the dependency resource, execute step 610.

Step 609: Proceed to execute a next step, that is, step 406 and step 412 in the embodiment shown in FIG. 10.

Step 610: Terminate the operation for the operation resource.

Specifically, for the operation resource CloseWindow, the dependency resource first selected in step 603 is the LivingroomWindowOpen. A representation of a resource indicating whether the window in the living room is opened, namely, a closed state (Closed), is further retrieved according to the URI http://gscl1/livingroomWindowStatus of the dependency resource LivingroomWindowOpen in step 604. In step 605, it is determined whether the representation of the resource retrieved in step 604 that indicates whether the window in the living room is opened meets the condition defined by Rule in the representation of the dependency resource LivingroomWindowOpen. The condition defined by Rule in the representation of the dependency resource LivingroomWindowOpen is an open state (Open), and therefore, a determining result is that the condition is not met, and step 607 is executed. In step 607, it is determined that the type of the dependency resource defined by logic in the representation of the dependency resource LivingroomWindowOpen is the sufficient condition type (OR), and therefore, step 608 is further executed. In step 608, it is determined that, for the operation resource CloseWindow, there is another dependency resource on which determining has not been performed, and therefore, the process returns to step 603. In step 603, the next dependency resource BedroomWindowOpen is selected, and a representation of a resource indicating whether the window in the bedroom is opened, namely, an open state (Open), is retrieved according to the URI http://gscl1/bedroomWindowStatus of the dependency resource BedroomWindowOpen in step 604. In step 605, it is determined whether the representation of the resource retrieved in step 604 that indicates whether the window in the bedroom is opened meets the condition defined by Rule in the representation of the dependency resource BedroomWindowOpen. The condition defined by Rule in the representation of the dependency resource BedroomWindowOpen is an open state (Open), and therefore, a determining result is that the condition is met, and step 606 is executed. In step 606, it is determined that the type of the dependency resource defined by logic in the representation of the dependency resource BedroomWindowOpen is the sufficient condition type, and step 609 is executed.

For the operation resource TurnOnAC, the dependency resource LivingroomWindowClosed is selected first in step 603. The representation of the resource indicating whether the window in the living room is opened, namely, the closed state (Closed), is retrieved according to the URI http://gscl1/livingroomWindowStatus of the dependency resource LivingroomWindowClosed in step 604. In step 605, it is determined whether the representation of the resource retrieved in step 604 that indicates whether the window in the living room is opened meets the condition defined by Rule in the representation of the LivingroomWindowOpen. The condition defined by Rule in the representation of the dependency resource LivingroomWindowOpen is the closed state (Closed), and therefore, a determining result is that the condition is met, and step 606 is executed. In step 606, it is determined that the type of the dependency resource defined by the logic in the representation of the dependency resource LivingroomWindowOpen is the necessary condition type (AND), and therefore, step 608 is further executed. In step 608, it is determined whether there is another dependency resource that is associated with the operation resource TurnOnAC and on which determining has not been performed. Because the dependency resource BedroomWindowClosed exists, step 603 is executed, and the dependency resource BedroomWindowClosed is selected. The representation of the resource indicating whether the window in the bedroom is opened, namely, the closed state (Closed), is retrieved according to the URI http://gscl1/bedroomWindowStatus of the dependency resource BedroomWindowClosed in step 604. In step 605, it is determined whether the representation of the resource retrieved in step 604 that indicates whether the window in the bedroom is opened meets the condition defined by Rule in the representation of the dependency resource BedroomWindowOpen. The condition defined by Rule in the representation of the dependency resource BedroomWindowOpen is the closed state (Closed), and therefore, a determining result is that the condition is not met, and step 607 is executed. In step 607, it is further determined that the logic in the representation of the dependency resource MemberAtHome defines that the type of the dependency resource is the necessary condition type, and step 610 is executed directly.

The following is an embodiment of how to retrieve execution results of operation requests after operations are triggered by a change of a subject resource. For details, reference may be made to step 409 and step 415 in the embodiment shown in FIG. 10, where operation execution results need to be retrieved after operation requests for the operation resource CloseWindow and operation resource TurnOnAC are sent separately. As shown in the resource structural diagram of the operation resource TurnOnAC shown in FIG. 5 and the resource structural diagram of the operation resource CloseWindow shown in FIG. 8, Output URI of the operation resource TurnOnAC is N/A, while Output URI of the operation resource CloseWindow is http://gscl2/allWindowStatus. A specific process of retrieving the operation execution results may include the steps shown in FIG. 15.

Step 701: Referring to step 409 and step 415 in the embodiment shown in FIG. 10, start after the operation requests for the operation resource CloseWindow and operation resource TurnOnAC are sent and operation responses are received.

Step 702: The GSCL1 determines whether the addresses (Output URI) reflecting the operation execution results in the representations of the operation resources are N/A. In this embodiment, Output URI in the representation of the operation resource TurnOnAC is N/A, and step 703 is executed, while Output URI in the representation of the operation resource CloseWindow is not N/A, and step 704 is executed.

Step 703: As shown in step 415 in the embodiment shown in FIG. 10, the process of retrieving the operation execution results occurs after the operation requests are sent and the operation responses are received. In a case in which Output URI in the representation of the operation resource is N/A, the operation response is directly saved into the execution result Result. For the operation resource TurnOnAC, the operation response corresponding to the operation request of the create type is OK, and therefore, OK is saved into Result in the representation of the operation resource TurnOnAC.

Step 704: In a case in which Output URI of the operation resource is not N/A, the address reflecting the operation execution result is saved into Output URI. That is, a URI of a resource that stores the operation execution result is saved into Output URI. Therefore, a retrieve request is sent to the URI of the resource that stores the operation execution result, so that the representation of the resource is retrieved. For the operation resource CloseWindow, a retrieve request is sent to the URI http://gscl2/allWindowStatus of the resource that stores the operation execution result, and a retrieve response is received. The retrieve response includes the representation of the allWindowStatus resource, that is, all windows are closed.

Step 705: Save the representation of the allWindowStatus resource retrieved in step 704 into the execution result Result in the representation of the operation resource CloseWindow.

Step 706: End.

Figure 16:
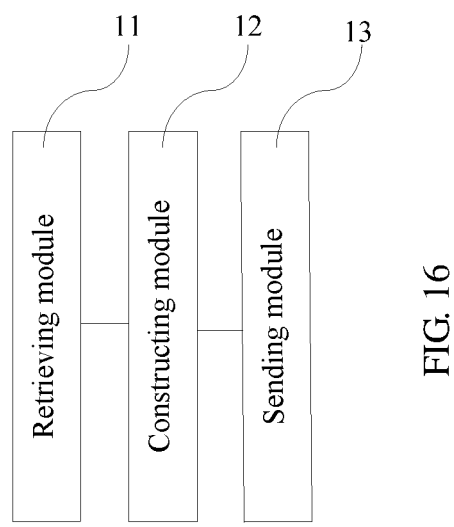
FIG. 16 is schematic structural diagram 1 of an operation triggering apparatus for machine-to-machine communications according to an embodiment of the present invention.

An embodiment of the present invention further provides an apparatus corresponding to the foregoing method. FIG. 16 is schematic structural diagram 1 of an operation triggering apparatus for machine-to-machine communications according to an embodiment of the present invention. The apparatus stores a representation of a subject resource, where the representation of the subject resource includes content of the subject resource and information about an operation resource associated with the subject resource, as shown in FIG. 16.

The apparatus includes a retrieving module 11, a constructing module 12, and a sending module 13. The retrieving module 11 is configured to retrieve a change result of the stored content of the subject resource when the content of the subject resource is changed, and retrieve, according to the information about the operation resource associated with the subject resource, a representation of the operation resource associated with the subject resource. The representation of the operation resource includes a condition for sending an operation request to an object resource and a uniform resource identifier of the object resource. The retrieving module is further configured to send the change result and the representation of the operation resource to the constructing module. The constructing module 12 is configured to receive the change result and the representation of the operation resource associated with the subject resource, and when it is determined that the change result meets the condition for sending the operation request to the object resource in the representation of the operation resource, construct the operation request for the object resource, and send the operation request to the sending module. The sending module 13 is configured to receive the operation request, and send the operation request to the object resource according to the uniform resource identifier of the object resource.

In the technical solution provided by the foregoing embodiment of the present invention, when the content of the subject resource is changed, the apparatus that stores the change result of the content of the subject resource retrieves, according to the information about the operation resource associated with the subject resource, the representation of the operation resource associated with the subject resource, and constructs the operation request for the object resource in the representation of the operation resource, and sends the operation request to the object resource in the representation of the operation resource. The operation triggering apparatus for machine-to-machine communications in the foregoing embodiment of the present invention may be middleware on an M2M platform or gateway. Both the M2M platform and the gateway are nodes having capabilities in a network, and therefore a problem of capability restriction does not exist, which is advantageous for handling situations in which services cannot be performed in restricted environments.

Further, the information about the operation resource associated with the subject resource is the representation of the operation resource associated with the subject resource, and the retrieving module retrieving, according to the information about the operation resource associated with the subject resource, a representation of the operation resource associated with the subject resource, includes: retrieving, according to the representation of the operation resource associated with the subject resource included in the representation of the subject resource, the representation of the operation resource associated with the subject resource. In an embodiment, the information about the operation resource associated with the subject resource is a uniform resource identifier of the operation resource associated with the subject resource, and the retrieving module retrieving, according to the information about the operation resource associated with the subject resource, a representation of the operation resource associated with the subject resource, includes: retrieving, according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs, and the retrieving module retrieving, according to the information about the operation resource associated with the subject resource, a representation of the operation resource associated with the subject resource, includes: retrieving, according to the uniform resource identifier of the operation resource set to which the operation resource belongs that is included in the representation of the subject resource, the representation of the operation resource associated with the subject resource, where the representation of the operation resource associated with the subject resource is a representation of an operation resource included in the operation resource set.

The operation triggering apparatus for machine-to-machine communications according to the foregoing embodiment of the present invention may further include a receiving module. The receiving module is configured to receive a subject resource update request before the retrieving module retrieves the change result of the content of the subject resource stored in the apparatus. The subject resource update request includes a representation of a new subject resource and a uniform resource identifier of the subject resource to be updated, where the representation of the new subject resource includes information about an operation resource associated with the new subject resource. The receiving module updates the stored representation of the subject resource to the representation of the new subject resource according to the uniform resource identifier of the subject resource to be updated. In an embodiment, the receiving module is configured to receive an operation resource create request before the retrieving module retrieves the change result of the content of the subject resource stored in the apparatus. The operation resource create request includes the representation of the operation resource associated with the subject resource and the uniform resource identifier of the operation resource set to which the operation resource belongs, and the receiving module adds the representation of the operation resource to the operation resource set according to the uniform resource identifier of the operation resource set to which the operation resource belongs.

In addition, in the foregoing embodiment of the present invention, the representation of the operation resource further includes a type of the operation request and an input parameter of the operation request, where the type of the operation request is create or update. When the input parameter is a uniform resource identifier of a parameter resource, the constructing module constructing the operation request for the object resource includes the constructing module: retrieving a representation of a new object resource from the parameter resource that is pointed to by the uniform resource identifier of the parameter resource, and constructing the operation request that includes the uniform resource identifier of the object resource and the representation of the new object resource and that is for the object resource in the representation of the operation resource. In an embodiment, when the input parameter is a representation of a new object resource, the constructing module constructing the operation request for the object resource includes the constructing module: constructing the operation request that includes the uniform resource identifier of the object resource and the representation of the new object resource and that is for the object resource in the representation of the operation resource.

In addition, the receiving module in the foregoing operation triggering apparatus for machine-to-machine communications is further configured to receive an operation resource update request before the retrieving module retrieves the change result of the content of the subject resource stored in the service capability middleware. The operation resource update request includes a representation of a new operation resource, where the representation of the new operation resource includes a representation of a dependency resource or a uniform resource identifier of a dependency resource. The receiving module is configured to update the stored representation of the operation resource to the representation of the new operation resource. The receiving module is further configured to receive a dependency resource create request before the retrieving module retrieves the change result of the content of the subject resource stored in the service capability middleware. The dependency resource create request includes a representation of a dependency resource and a uniform resource identifier of a dependency resource set to which the dependency resource belongs. The receiving module is also configured to save the representation of the dependency resource to the dependency resource set according to the uniform resource identifier of the dependency resource set to which the dependency resource belongs, and add the uniform resource identifier of the dependency resource set to the representation of the operation resource.

Further, in the technical solution in which the dependency resource exists, the foregoing apparatus may further include a determining module. The retrieving module is further configured to retrieve, according to the representation of the operation resource, the representation of the dependency resource associated with the operation resource, retrieve a representation of a condition resource that is pointed to by a uniform resource identifier in the representation of the dependency resource, and send the representation of the condition resource and a condition in the representation of the dependency resource to the determining module. The determining module is configured to receive the representation of the condition resource, and determine, according to the representation of the condition resource, that the condition in the representation of the dependency resource is met.

In an embodiment, types of the dependency resource are classified into a sufficient condition type and a necessary condition type, and a dependency resource quantity is at least one. Before the constructing module constructs the operation request for the object resource in the representation of the operation resource, the determining module is further configured to determine that a condition specified by at least one dependency resource of the sufficient condition type is met, or before the constructing module constructs the operation request for the object resource in the representation of the operation resource, the determining module is further configured to determine that conditions specified by all dependency resources of the necessary condition type are met.

The association relationship between the operation resource and the dependency resource may be implemented in three manners. The retrieving module retrieving, according to the representation of the operation resource, the representation of the dependency resource associated with the operation resource, includes: retrieving, according to the representation of the dependency resource included in the representation of the operation resource, the representation of the dependency resource associated with the operation resource; or retrieving, according to the uniform resource identifier of the dependency resource included in the representation of the operation resource, the representation of the dependency resource associated with the operation resource; or retrieving, according to the uniform resource identifier, included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

In the foregoing embodiment of the present invention, at least two operation resources are associated with the subject resource, and representations of the operation resources further include priorities. The constructing module constructing the operation request for the object resource in the representation of the operation resource includes: constructing an operation request for an object resource in the representation of each operation resource in sequence according to the priorities in the representations of the operation resources.

In the foregoing embodiment of the present invention, the representation of the operation resource further includes an operation execution result. The receiving module is further configured to receive an operation response returned by a device that the object resource is located, and save the operation response into the operation execution result in the representation of the operation resource. In an embodiment, the representation of the operation resource further includes an address reflecting an operation execution result and the operation execution result. The receiving module is further configured to receive an operation response returned by the device in which the object resource is located, and the retrieving module is further configured to retrieve, according to the address reflecting the operation execution result, an operation result corresponding to the operation request, and save the operation result corresponding to the operation request into the operation execution result.

Figure 17:
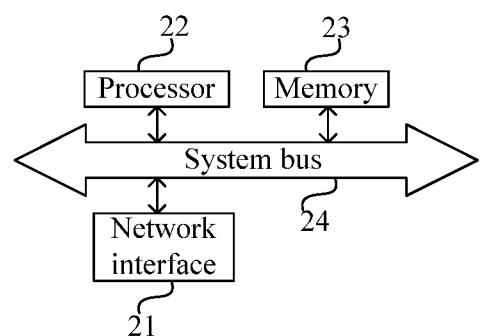
FIG. 17 is schematic structural diagram 2 of an operation triggering apparatus for machine-to-machine communications according to an embodiment of the present invention.

In addition, an embodiment of the present invention further provides another operation triggering apparatus for machine-to-machine communications. FIG. 17 is schematic structural diagram 2 of an operation triggering apparatus for machine-to-machine communications according to an embodiment of the present invention. As shown in FIG. 17, the operation triggering apparatus for machine-to-machine communications includes a network interface 21, a processor 22, and a memory 23.

The network interface 21 is configured to perform communication with an external device. The memory 23 is configured to store an application program and store a representation of a subject resource. The representation of the subject resource includes content of the subject resource and information about an operation resource associated with the subject resource. The processor 22 is configured to: invoke the application program stored in the memory. When the content of the subject resource is changed, the processor 22 is configured to retrieve a change result of the content of the subject resource stored in the memory, and retrieve, according to the information about the operation resource associated with the subject resource, a representation of the operation resource associated with the subject resource. The representation of the operation resource includes a condition for sending an operation request to an object resource and a uniform resource identifier of the object resource. When it is determined that the change result meets the condition for sending the operation request to the object resource in the representation of the operation resource, the processor 22 is configured to construct the operation request for the object resource. The network interface 21 is further configured to send the operation request to the object resource according to the uniform resource identifier of the object resource.

In the technical solution provided by the foregoing embodiment of the present invention, the network interface 21, processor 22, and memory 23 may be connected by a system bus 24. When the content of the subject resource is changed, the service capability middleware that stores the change result of the content of the subject resource retrieves, according to the information about the operation resource associated with the subject resource, the representation of the operation resource associated with the subject resource, and constructs the operation request for the object resource in the representation of the operation resource, and sends the operation request to the object resource in the representation of the operation resource. The computer device in the foregoing embodiment of the present invention may be an M2M platform or gateway. Both the M2M platform and the gateway are nodes having capabilities in a network, and therefore a problem of capability restriction does not exist, which is advantageous for handling situations in which services cannot be performed in restricted environments.

In the foregoing embodiment of the present invention, the information about the operation resource associated with the subject resource is the representation of the operation resource associated with the subject resource. The processor retrieving, according to the representation of the subject resource, a representation of the operation resource associated with the subject resource, includes the processor: retrieving, according to the representation of the operation resource included in the representation of the subject resource, the representation of the operation resource associated with the subject resource. In an embodiment, the information about the operation resource associated with the subject resource is a uniform resource identifier of the operation resource associated with the subject resource. The processor retrieving, according to the representation of the subject resource, a representation of the operation resource associated with the subject resource, includes the processor: retrieving, according to the uniform resource identifier of the operation resource included in the representation of the subject resource, the representation of the operation resource associated with the subject resource. In an embodiment, the information about the operation resource associated with the subject resource is a uniform resource identifier of an operation resource set to which the operation resource associated with the subject resource belongs. The processor retrieving, according to the representation of the subject resource, a representation of the operation resource associated with the subject resource, includes the processor: retrieving, according to the uniform resource identifier of the operation resource set to which the operation resource belongs included in the representation of the subject resource, the representation of the operation resource associated with the subject resource, where the representation of the operation resource associated with the subject resource is a representation of an operation resource included in the operation resource set.

In addition, the network interface is further configured to receive a subject resource update request, where the subject resource update request includes a representation of a new subject resource and a uniform resource identifier of the subject resource to be updated. The representation of the new subject resource includes information about an operation resource associated with the new subject resource. The processor invokes the application program stored in the memory to update the stored representation of the subject resource to the representation of the new subject resource according to the uniform resource identifier of the subject resource to be updated. In an embodiment, the network interface is further configured to receive an operation resource create request. The operation resource create request includes the representation of the operation resource associated with the subject resource and the uniform resource identifier of the operation resource set to which the operation resource associated with the subject resource belongs. The processor invokes the application program stored in the memory to add the representation of the operation resource to the operation resource set according to the uniform resource identifier of the operation resource set to which the operation resource belongs.

In the foregoing embodiment of the present invention, the representation of the operation resource further includes a type of the operation request and an input parameter of the operation request, where the type of the operation request is create or update; and when the input parameter is a uniform resource identifier of a parameter resource, the processor retrieves a representation of a new object resource from the parameter resource that is pointed to by the uniform resource identifier of the parameter resource, and constructs the operation request that includes the uniform resource identifier of the object resource and the representation of the new object resource and that is for the object resource in the representation of the operation resource; or when the input parameter is a representation of a new object resource, the processor constructs the operation request that includes the uniform resource identifier of the object resource and the representation of the new object resource and that is for the object resource in the representation of the operation resource.

In the foregoing embodiment of the present invention, the network interface is further configured to receive an operation resource update request, where the operation resource update request includes a representation of a new operation resource, where the representation of the new operation resource includes a representation of a dependency resource or a uniform resource identifier of a dependency resource. The processor invokes the application program stored in the memory to update the stored representation of the operation resource to the representation of the new operation resource. In an embodiment, the network interface is further configured to receive a dependency resource create request, where the dependency resource create request includes a representation of a dependency resource and a uniform resource identifier of a dependency resource set to which the dependency resource belongs. The processor invokes the application program stored in the memory to save the representation of the dependency resource to the dependency resource set according to the uniform resource identifier of the dependency resource set to which the dependency resource belongs, and add the uniform resource identifier of the dependency resource set to the representation of the operation resource.

Further, the processor in the foregoing embodiment further retrieves, according to the representation of the operation resource, the representation of the dependency resource associated with the operation resource, retrieves a representation of a condition resource that is pointed to by a uniform resource identifier in the representation of the dependency resource, and determines, according to the representation of the condition resource, that a condition in the representation of the dependency resource is met.

Types of the dependency resource are classified into a sufficient condition type and a necessary condition type, a dependency resource quantity is at least one, and before constructing the operation request for the object resource in the representation of the operation resource, the processor further determines that a condition specified by at least one dependency resource of the sufficient condition type is met (that is, the processor constructs the operation request for the object resource in the representation of the operation resource when determining that a condition specified by at least one dependency resource of the sufficient condition type is met); or before constructing the operation request for the object resource in the representation of the operation resource, the processor further determines that conditions specified by all dependency resources of the necessary condition type are met (that is, the processor constructs the operation request for the object resource in the representation of the operation resource when determining that conditions specified by all dependency resources of the necessary condition type are met).

The processor retrieves, according to the representation of the dependency resource included in the representation of the operation resource, the representation of the dependency resource associated with the operation resource. In an embodiment, the processor retrieves, according to the uniform resource identifier of the dependency resource included in the representation of the operation resource, the representation of the dependency resource associated with the operation resource. In an embodiment, the processor retrieves, according to the uniform resource identifier, included in the representation of the operation resource, of the dependency resource set to which the dependency resource belongs, the representation of the dependency resource associated with the operation resource, where the representation of the dependency resource associated with the operation resource is a representation of a dependency resource included in the dependency resource set.

In addition, at least two operation resources are associated with the subject resource, representations of the operation resources further include priorities, and the processor constructs an operation request for an object resource in the representation of each operation resource in sequence according to the priorities in the representations of the operation resources.

The representation of the operation resource further includes an operation execution result, the network interface is further configured to receive an operation response returned by the device in which the object resource is located, and the processor saves the operation response into the operation execution result in the representation of the operation resource. In an embodiment, the representation of the operation resource further includes an address reflecting an operation execution result and the operation execution result, the network interface is further configured to receive an operation response returned by the device in which the object resource is located, and the processor retrieves, according to the address reflecting the operation execution result, an operation result corresponding to the operation request, and saves the operation result corresponding to the operation request into the operation execution result.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
obtaining, by a service capability middleware, information of a subject resource, wherein the information of the subject resource comprises content of the subject resource and information about an operation resource associated with the subject resource, and wherein the service capability middleware is integrated in a gateway or a service platform;
monitoring, by the service capability middleware, for a change of the content of the subject resource according to the information of the subject resource, to determine a change result;
detecting, by the service capability middleware, that the change result meets a condition for sending an operation request to an object resource; and
sending, by service capability middleware, the operation request to the object resource according to an identifier of the object resource, wherein the condition and the identifier of the object resource are determined according to the information about the operation resource associated with the subject resource.

2. The method according to claim 1, wherein the identifier of the object resource is a uniform resource identifier, and the object resource is located at a device.

3. The method according to claim 1, further comprising:
receiving, by the service capability middleware, a subject resource update request comprising a uniform resource identifier of a subject resource to be updated, and information about an operation resource associated with the subject resource to be updated; and
updating, by the service capability middleware, stored information according to the subject resource update request.

4. The method according to claim 1, wherein a plurality of operation resources are associated with the subject resource, each operation resource of the plurality of operation resources has a respective priority, and the method comprises:
detecting, by the service capability middleware, that the change result meets a condition for sending a plurality of operation requests to the object resource, wherein each operation request of the plurality of operation requests is determined based on a respective operation resource; and
sending, by the service capability middleware, the plurality of operation requests to the object resource according to the identifier of the object resource and the respective priority of each operation resource of the plurality of operation resources.

5. The method according to claim 1, wherein the service capability middleware is integrated in a gateway.

6. The method according to claim 1, wherein the service capability middleware is integrated in a service platform.

7. An apparatus, comprising:
a network interface, configured to perform communication with an external device;
a non-transitory memory, configured to store an application program of service capability middleware integrated with the apparatus, a content of a subject resource, and information about an operation resource associated with the subject resource; and
a processor, configured to invoke the application program stored in the non-transitory memory to:
obtain information of a subject resource, wherein the information of the subject resource comprises the content of the subject resource and the information about the operation resource associated with the subject resource;
monitor for a change of the content of the subject resource according to the information of the subject resource, to determine a change result;
detect that the change result meets the condition for sending an operation request to an object resource; and
send the operation request to the object resource according to an identifier of the object resource, wherein the condition and the identifier of the object resource are determined according to the information about the operation resource associated with the subject resource.

8. The apparatus according to claim 7, wherein the information about the operation resource associated with the subject resource comprises a type of the operation request and an input parameter of the operation request.

9. A computer program stored in a non-transitory memory, wherein a processor is configured to execute the computer program to:
obtain information of a subject resource, wherein the information of the subject resource comprises content of the subject resource and information about an operation resource associated with the subject resource;
monitor for a change of the content of the subject resource according to the information of the subject resource, to determine a change result;
detect that the change result meets a condition for sending an operation request to an object resource; and
send the operation request to the object resource according to an identifier of the object resource, wherein the condition and the identifier of the object resource are determined according to the information about an operation resource associated with the subject resource.

10. The computer program stored in the non-transitory memory according to claim 9, wherein the identifier of the object resource is a uniform resource identifier.

11. The computer program stored in a non-transitory memory according to claim 9, wherein a processor is configured to further execute the computer program to:
receive a subject resource update request comprising a uniform resource identifier of a subject resource to be updated, and information about an operation resource associated with the subject resource to be updated; and
update stored information according to the subject resource update request.

12. The computer program stored in a non-transitory memory according to claim 9, wherein a processor is configured to further execute the computer program to:
detect that the change result meets a condition for sending a plurality of operation requests to the object resource, wherein each operation request of the plurality of operation requests is determined based on a respective operation resource; and
send the plurality of operation requests to the object resource according to the identifier of the object resource and the respective priority of each operation resource of the plurality of operation resources.

* * * * *